United States Patent [19]

Sugimura et al.

[11] Patent Number: 4,858,131
[45] Date of Patent: Aug. 15, 1989

[54] CLUTCH TARGET POSITION CONTROL SYSTEM

[75] Inventors: Toshiya Sugimura; Hitoshi Kasai, both of Numazu; Hiroshi Yoshimura, Yokohama, all of Japan

[73] Assignee: Fujitsu Limited, Kawasaki, Japan

[21] Appl. No.: 90,501

[22] Filed: Aug. 28, 1987

[30] Foreign Application Priority Data

Aug. 29, 1986 [JP] Japan ................................ 61-203226
Aug. 29, 1986 [JP] Japan ................................ 61-203227

[51] Int. Cl.⁴ ...................... G06F 15/50; G06G 7/70; F16D 43/22; F16D 23/10
[52] U.S. Cl. .............................. 364/424.1; 192/0.033; 192/0.096; 192/0.076
[58] Field of Search ................... 364/424.1; 192/0.033, 192/0.076, 0.03, 0.075, 0.096, 0.092, 0.094

[56] References Cited

U.S. PATENT DOCUMENTS

| | | | |
|---|---|---|---|
| 4,062,624 | 11/1986 | Mitsui et al. | 192/0.076 |
| 4,518,068 | 5/1985 | Oguma et al. | 192/0.052 |
| 4,529,072 | 7/1985 | Oguma et al. | 192/0.052 |
| 4,618,043 | 10/1986 | Hattori et al. | 192/0.052 |
| 4,722,429 | 2/1988 | Kono | 192/0.033 |
| 4,730,711 | 3/1988 | Sakakiyama | 192/0.033 |

FOREIGN PATENT DOCUMENTS 0141676 5/1985 European Pat. Off. .
2156454 10/1985 United Kingdom .
2170571 8/1986 United Kingdom .

*Primary Examiner*—Eugene R. LaRoche
*Assistant Examiner*—Michael B. Shingleton
*Attorney, Agent, or Firm*—Staas & Halsey

[57] ABSTRACT

A clutch target position control system of an engine includes a clutch actuator for controlling a clutch stroke, a sensor for detecting a parameter corresponding to an accelerator pedal depression amount, an engine revolution sensor for detecting a revolution speed of the engine and an input shaft revolution sensor for detecting a revolution speed of the input shaft. The disclosed system utilizes the steps of: reading clutch engagement amounts from map tables of registered data corresponding to each of the sensors, the detected signals from each sensor being converted into and used as address signals; calculating a total of three read clutch engagement amounts; and controlling the clutch actuator to control the actual clutch engagement amount on the basis of the calculated total amount.

15 Claims, 28 Drawing Sheets

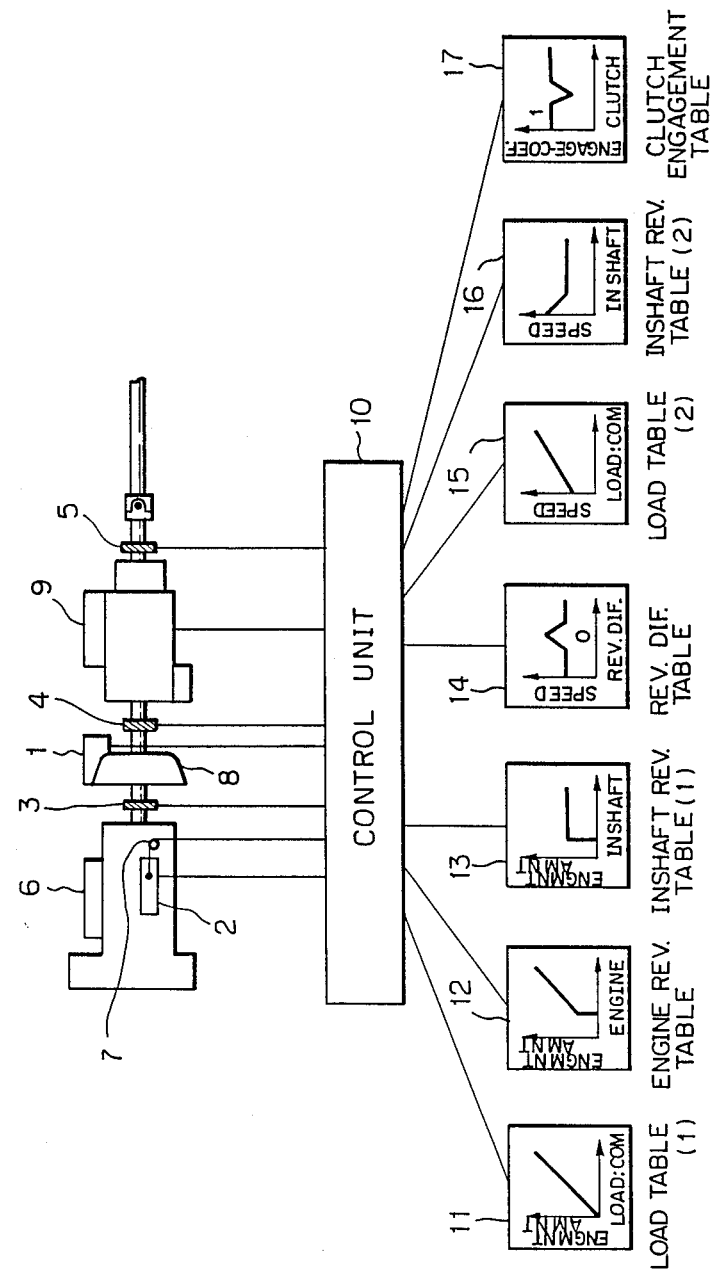

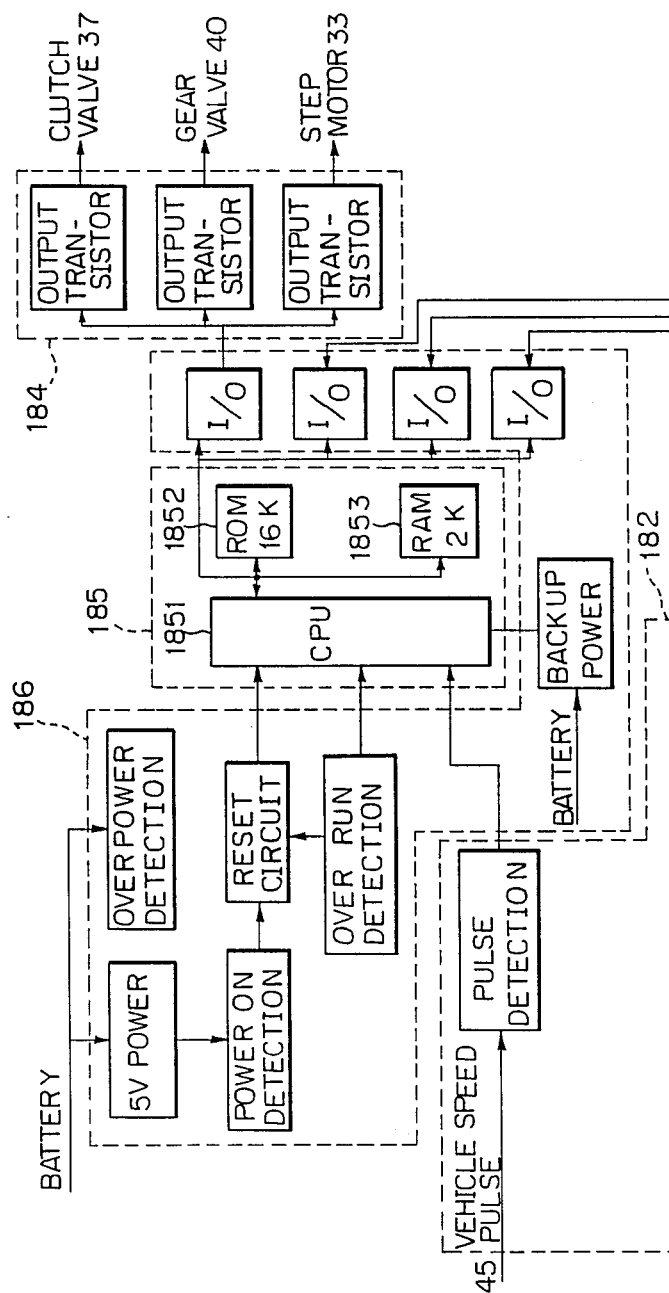

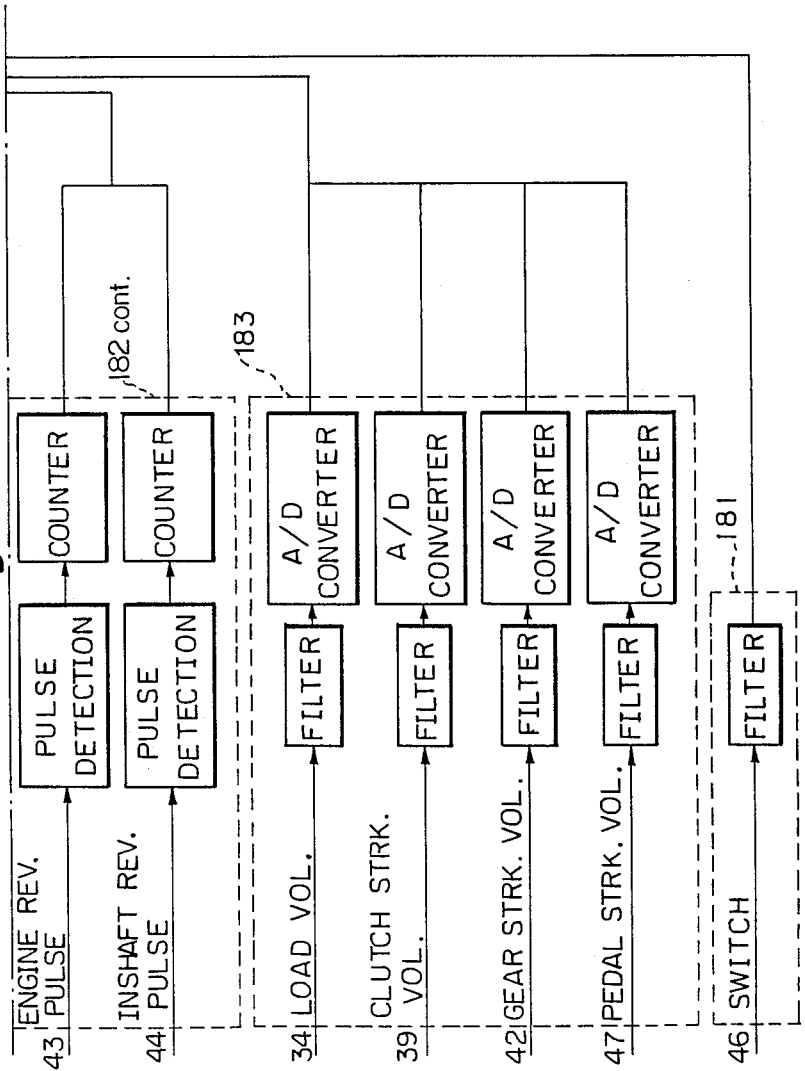

CLUTCH TARGET POSITION CONTROL SYSTEM

BACKGROUND OF THE INVENTION (1) Field of the Invention

The present invention relates to a clutch target position control system wherein the clutch position is determined on the basis of the throttle opening, the engine revolutional speed, and the input shaft revolutional speed.

The present invention also relates to an automatic clutch system, in particular, to a clutch control system wherein the clutch target position and the clutch speed are automatically controlled.

(2) Description of the Related Art

Conventionally, the target engagement position of an automatic clutch is determined in relation only to the accelerator pedal depression movement, as disclosed in Japanese Unexamined Patent Publication (Kokai) No. 60-11756. However, the engine revolutional speed is high before the clutch is engaged and drops after the clutch is engaged, and thus it is very difficult to control the clutch, in such a manner that a smooth driving of the car is realized, with the prior art control system when the engine speed is slow and in response to the above-mentioned engine revolutional speed change.

In a prior art automatic clutch system, the clutch speed is controlled in accordance with the driving condition of the car, which condition is classified into three driving modes as described below.

(1) Slow Speed Mode: The clutch target position is determined on the basis of the accelerator pedal depression movement. The clutch speed, i.e., the speed of the clutch plate, is compensated in response to the clutch position.

(2) Start Mode: A basic clutch speed is determined on the basis of the accelerator pedal depression movement. The clutch is controlled by compensating the basic clutch speed in response to the clutch stroke and the engine revolutional speed change.

(3) Shift Mode: A basic clutch speed is determined on the basis of the accelerator pedal depression movement. The clutch is controlled by compensating the speed in response to the difference between the engine revolutional speed and the input shaft revolutional speed.

In the above-mentioned prior art clutch control system, the clutch target position and the clutch speed are determined on the basis of different parameters, respectively. The operation is divided into three modes, and thus a complicated algorithm must be prepared. Further, another independent algorithm for disengagement of the clutch at the time of releasing the accelerator pedal must be prepared.

The afore-mentioned three modes are used to control the engagement of the clutch. To control the disengagement of the clutch, in the slow speed mode, a minimum engine revolutional speed in relation to engine stall is predetermined, and when the actual engine revolutional speed reaches the predetermined value, the clutch is disengaged. In the start mode, a minimum engine revolutional speed in relation to the clutch position is predetermined, and when the actual engine revolutional speed reaches the predetermined value, the clutch engagement movement is stopped. When the engine revolutional speed is further lowered, the clutch is controlled in the same manner as in the slow speed mode. With such a control system in the slow speed mode and start mode, when a sudden torque change is applied to the engine due to a steep slope or a sidewalk curb, the clutch disengagement movement due to the engine speed reduction and clutch engagement movement due to the engine speed restoration are repeated, which causes the engine to stall and makes the driver feel uncomfortable. Also, the algorithm is complicated due to the many control modes and control parameter data, which results in time wastage when selecting the data.

SUMMARY OF THE INVENTION

To alleviate the above-mentioned problems, in accordance with the present invention, there is provided a clutch target position control system of an engine comprising: a clutch actuator for controlling a clutch stroke; a load sensor for detecting a throttle opening of the engine; an engine revolutional speed sensor for detecting a revolutional speed of the engine; and an input shaft revolutional speed sensor for detecting a revolutional speed of the input shaft. Each detection signal from the load sensor, engine revolutional speed sensor and input shaft revolutional speed sensor is used as an address signal for reading a clutch engagement amount from a map table registered beforehand for each of the sensors and calculate a total of three read clutch engagement amounts, the clutch actuator controlling the clutch engagement amount on the basis of the total amount.

Also, to alleviate the afore-mentioned problems, in accordance with the present invention, there is provided a clutch target position control system of an engine comprising: a clutch actuator for controlling a clutch stroke; a load sensor for detecting a throttle opening of the engine; an engine revolutional speed sensor for detecting a revolutional speed of the engine; and an input shaft revolutional speed sensor for detecting a revolutional speed of the input shaft. Each detection signal from the load sensor, engine revolutional speed sensor and input shaft revolutional speed sensor is used as an address signal for reading a clutch engagement amount from a map table registered or stored beforehand for each of the sensors to calculate a total of three read clutch engagement amounts to determine a clutch target position, wherein the difference between engine revolutional speed and said input shaft revolutional speed is calculated. A clutch speed is read from a map table registered beforehand for each revolutional speed difference signal, throttle opening signal from the load sensor and input shaft revolutional speed signal from the input shaft revolutional speed sensor. Each signal is used as an address signal, for calculating the highest clutch speed among the three read clutch speeds. Registered beforehand is a map table representing a compensation coefficient for clutch engagement in relation to the clutch position, which is used as an address signal. A compensation coefficient for clutch engagement is read from the map table when the clutch position at the calculated highest clutch speed is in the clutch engagement side of a half-clutch position. A desired clutch speed is calculated by multiplying the highest clutch speed by the compensation coefficient, the clutch actuator controlling the clutch movement in accordance with the calculated target clutch speed.

BRIEF DESCRIPTION OF THE DRAWINGS

FIG. 5 is a view representing another principle construction of the present invention;

FIGS. 12(a) and 12(b) are is a constructional views of a control circuit according to the present invention;

DESCRIPTION OF THE PREFERRED EMBODIMENTS

Figure 1:
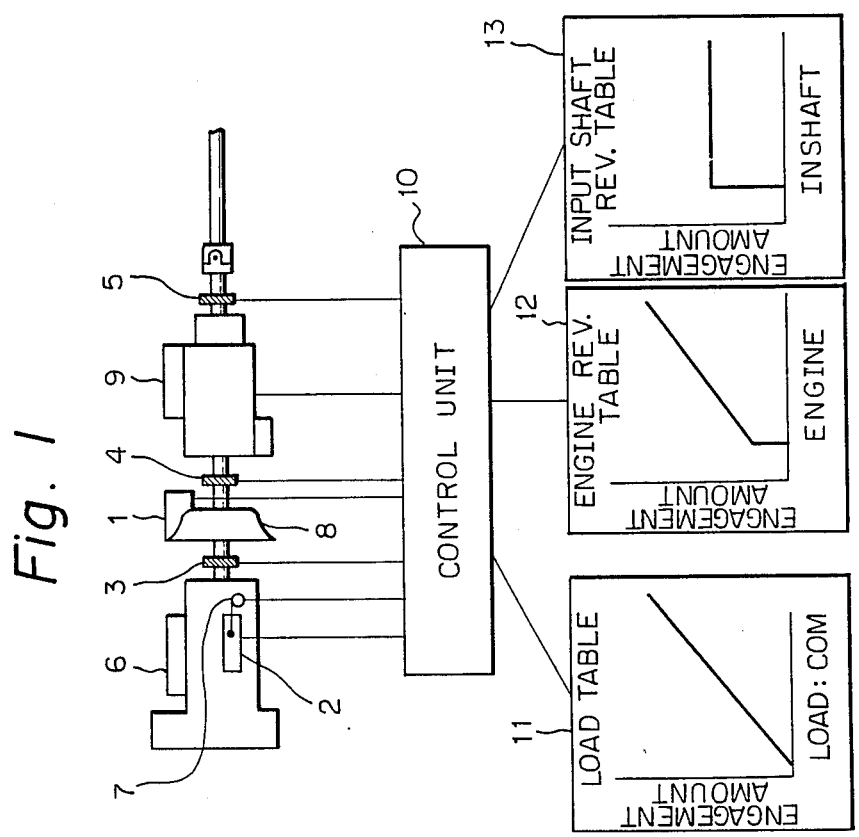
FIG. 1 is a view representing a principle construction of the present invention.

A principle of the present invention is now described with reference to FIG. 1, wherein a clutch actuator 1 drives a clutch 8 in accordance with a calculated clutch engagement amount; a load sensor 2 detects the fuel amount supplied to an engine 6, for example by detecting a throttle opening of the engine, that is, the load sensor 2 detects a parameter corresponding to the acceleration pedal depression amount which corresponds to the driver's intention, since the fuel amount which corresponds to the throttle opening is changed by the acceleration pedal depression amount; an engine revolutional speed sensor 3 detects the revolutional speed of the engine 6; an input shaft revolutional speed sensor 4 detects the revolutional speed of an input shaft; a load table 11, an engine revolution table 12, and an input shaft revolution table 13 are map tables for reading a clutch engagement amount registered or stored beforehand, by using as address signals the throttle opening detection signal from the load sensor 2, the engine revolutional speed detection signal from the engine revolutional speed sensor 3, and input shaft revolutional speed detection signal from the input shaft revolution speed sensor 4, respectively; and, the various control operations are conducted through a control unit 10.

The load table 11 registers a data map wherein the clutch engagement amount increases in proportional relation to the throttle opening dependent upon accelerator pedal depression amount. This is because, in a vehicle provided with an automatic clutch system, the accelerator pedal depression amount is most relevant to the driver's intention to drive the vehicle. A large accelerator pedal depression amount represents the driver's will to start the vehicle fast or increase the vehicle speed in a short time. A small accelerator pedal depression amount represents the driver's will to slowly start the vehicle or not to increase the vehicle speed. Therefore, the map table represents a graphical shape wherein the clutch engagement amount is large when the pedal depression amount is large and the clutch engagement amount is small when the pedal depression amount is small.

The engine revolution table 12 represents a data map wherein the clutch engagement amount is zero below a predetermined revolution speed. For example, a speed slightly higher than the idle speed, and the clutch engagement amount becomes a predetermined amount at the predetermined engine speed and then increases in proportional relation to the engine revolution speed.

Such a data map 12 aims to prevent the over-run of the engine at a high revolution speed by increasing the clutch engagement amount. Also, the data map 12 aims to prevent the engine stall due to the shortage of engine torque at a low revolution speed by disengaging the clutch.

The input shaft revolution table 13 represents a data map wherein the clutch engagement amount is a predetermined constant amount when the input shaft revolution speed is over a predetermined value and zero when the input shaft revolution speed is below the predetermined value.

With this data map 13, the clutch engagement amount is set to a predetermined value when the input shaft revolution speed of the transmission is high which means that the vehicle speed is high, in order to maintain the clutch engagement state even if the accelerator pedal is released to decrease the vehicle speed when the vehicle is running at a high speed. On the other hand the clutch engagement amount is reduced to zero to avoid engine stall due to the overload of the engine when the input shaft revolution speed is lowered below the predetermined value.

The clutch engagement amount of each map table is set as follows.

With regard to the load table 11, the clutch engagement amount is "0" and about 5.3 mm, when the output of the load sensor 2 is "0" and "full", respectively. The clutch engagement amount is increased in proportion to the output of the sensor 2 between "0" and "full", respectively.

With regard to the engine revolution table 12, the clutch engagement amount is "0" when the engine revolution speed is between idle (500 rpm) and about 800 rpm, then the engagement amount is about 1.75 mm when the engine revolution speed reaches 800 rpm, after that the engagement amount is increased in proportion to the engine revolution speed until the speed reaches the maximum value of about 2700 rpm where the clutch engagement amount is about 7 mm.

With regard to the input shaft revolution table 13, the clutch engagement amount is "0" when the input shaft revolution speed is below 650 rpm and the engagement amount is increased to about 6.6 mm when the input shaft revolution speed is over 650 rpm.

The clutch shift amount between the disengaged state and the fully engaged state is 13 mm. The entire clutch stroke is 20 mm, the shift amount of 7 mm being reserved as a margine for wear of the clutch.

In FIG. 1, a clutch engagement amount is read from the load table 11 in accordance with the throttle opening detected by the load sensor 2, using the detection signal as an address signal. Similarly, clutch engagement amounts are read from the map tables 12 and 13, in accordance with detection signals from the engine revolutional speed sensor 3 and input shaft revolutional speed sensor 4, respectively.

The total of the three read clutch engagement amounts is calculated, and a clutch target position is determined on the basis of a difference between a reference value and the calculated total amount. The clutch 8 is controlled in accordance with the target position, thus enabling an enhancement in performance of the clutch in response to the depression movement of the accelerator pedal.

The construction and function of an embodiment of the present invention are described in detail with reference to FIGS. 1 to 4.

First, a clutch movement from a disengaged state to a fully engaged state by depressing the accelerator pedal is described. With reference to FIG. 1, in response to the depression movement of the accelerator pedal (not shown) by the driver, a load actuator 7 opens the throttle to inject fuel or a mixture of fuel and air to the engine 6. The load sensor 2 detects the throttle opening at this moment and transmits the detection signal to the control unit 10. The control unit 10 then reads the clutch engagement amount from the load table 11 by using the throttle opening detection signal as an address signal. Similarly, the engine revolutional speed sensor 3 detects the engine revolution speed, which rises slightly after the throttle is opened, and transmits the engine revolutional speed detection signal to the control unit 10. The control unit 10 then reads a clutch engagement amount from the engine revolution table 12 by using the engine revolutional speed signal as an address signal. Also, the input shaft revolutional speed sensor 4 detects the revolution of the input shaft and transmits the input shaft revolutional speed detection signal to the control unit 10. The control unit 10 then reads a clutch engagement amount from the input shaft revolution table 13 by using the input shaft revolutional speed detection signal as an address signal.

A total of the three clutch engagement amounts read from the map tables is calculated, then the clutch is engaged in accordance with the difference between the reference value and the calculated total amount. The calculated difference is used as the clutch target position. With such a method of controlling the clutch engagement, it is possible to upgrade the performance of the clutch in response to the depression movement of the accelerator pedal, and achieve a smooth clutch engagement.

In more detail, at the time of depressing the accelerator pedal, the clutch engagement is controlled on the basis of the throttle opening which corresponds to the depression movement of the accelerator pedal. Then, the clutch engagement amount is increased as the engine revolutional speed increases, so that the engine torque is transmitted to the input shaft to raise the vehicle speed and prevent an overrun of the engine 6. After that, the clutch engagement amount is further increased as the input shaft revolutional speed increases, to fully engage the clutch.

Note that transmission actuator 9 shifts the torque position of a transmission, and a speed sensor 5 detects a vehicle speed by detecting the revolutional speed of a an output shaft.

The control operation of the FIG. 1 structure is further described with reference to FIG. 2.

An accelerator pedal stroke sensor may be attached to the pedal instead of the provision of the load sensor 2, to directly detect the accelerator pedal depression amount, and access the load table 11 by using the output of the stroke sensor as the address signal.

Figure 2:
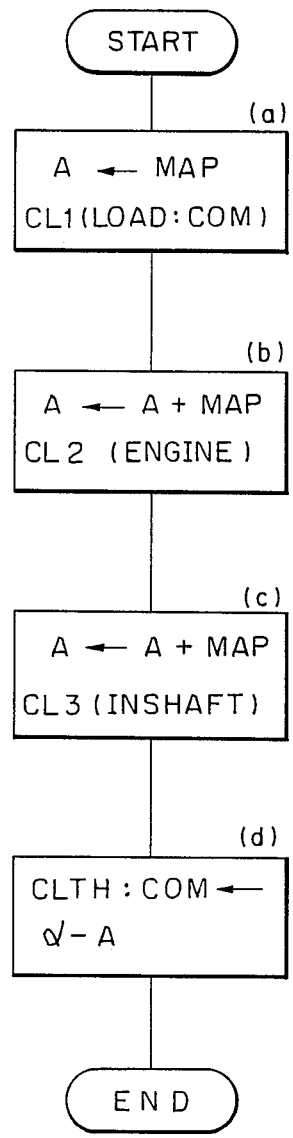
FIG. 2 is a flow chart representing the function of the present invention.

In step (a) of the flow chart of FIG. 2, a MAP CL1 (LOAD:COM) is stored as a reserved variable A. The LOAD:COM is an input variable corresponding to the throttle opening detection signal from the load sensor 2 converted to a signal usable in the system and represented in hexadecimal digits from $00 to $FF. MAP CL1 is a function in relation to the LOAD:COM and corresponds to an increased amount of clutch engagement in response to the throttle opening. In other words, step (a) of the flow chart represents an operation wherein a clutch engagement amount is read from the ordinate of the load table 11 of FIG. 1 corresponding to the LOAD:COM value in the abscissa, and the read clutch engagement amount is added to the reserved variable A to modify the same. Accordingly, in the manner described above, a target clutch engagement amount is calculated on the basis of the throttle opening in response to the depression movement of the accelerator pedal.

In step (b) of FIG. 2, a MAP CL2 (ENGINE) is added to the reserved variable A to modify the same. ENGINE is an input variable corresponding to the engine revolutional speed detection signal from the engine revolution sensor 3 converted to a signal usable in the system and represented in hexadecimal digits from $00 to $FF. MAP CL2 is a function in relation to the ENGINE and corresponds to an increased amount of clutch engagement in response to the engine revolutional speed. In other words, step (b) of the flow chart represents an operation wherein a clutch engagement amount is read from the ordinate of the engine revolution table 12 of FIG. 1, corresponding to the ENGINE value in the abscissa, and the read clutch engagement amount is added to the reserved variable A to modify the same. By the process mentioned above, a clutch engagement amount on the basis of the engine revolutional speed is calculated, enabling a prevention of engine stalling.

In step (c) of FIG. 2, a MAP CL3 (INSHAFT) is added to the reserved variable A to renew the same. INSHAFT is an input variable corresponding to the input shaft revolutional speed detection signal from the input shaft revolution sensor 4 converted to a signal usable in the system and represented in hexadecimal digits from $00 to $FF. MAP CL3 is a function in relation to the INSHAFT and corresponds to an increased amount of clutch engagement in response to the input shaft revolutional speed. In other words, step (c) of the flow chart represents an operation wherein a clutch engagement amount is read from the ordinate of the input shaft revolution table 13 of FIG. 1, corresponding to the INSHAFT value in the abscissa and the read clutch engagement amount is added to the reserved variable A to modify the same. In such a manner, a clutch engagement amount on the basis of the input shaft revolutional speed is calculated.

In step (d) of FIG. 2, a clutch target position is calculated. CLTH:COM is the calculated clutch target position having values represented in hexadecimal digits from $00 to $FF. The clutch is engaged at $00 and disengaged at $FF. $CO represents a half-clutch position. A reference clutch target position $\alpha$ is determined to be located at an offset position, for example, at $EA, between the half-clutch position $CO and the disengaged position $FF. The reference position $\alpha$ is a predetermined fixed value which is changeable in accordance with the amount of wear of the clutch.

The clutch target position CLTH:COM is a difference between the reference position α and the three calculated clutch engagement amounts, dependent upon three factors, namely, the throttle opening, the engine revolutional speed, and the input shaft revolution speed. The clutch target position is represented as follows.

$$\begin{aligned} \text{CLTH:COM} &= \alpha - A \\ &= \alpha - [\text{MAP CL1 (LOAD:COM)} \\ &\quad + \text{MAP CL2 (ENGINE)} \\ &\quad + \text{MAP CL3 (INSHAFT)}] \ldots (1) \end{aligned}$$

wherein, LOAD:COM is an input variable of the throttle opening; ENGINE represents the engine revolutional speed; INSHAFT represents the input shaft revolutional speed; α represents the reference position of the clutch between the half-clutch position and the fully disengaged position; and CLTH:COM is the calculated clutch target position.

Figure 3:
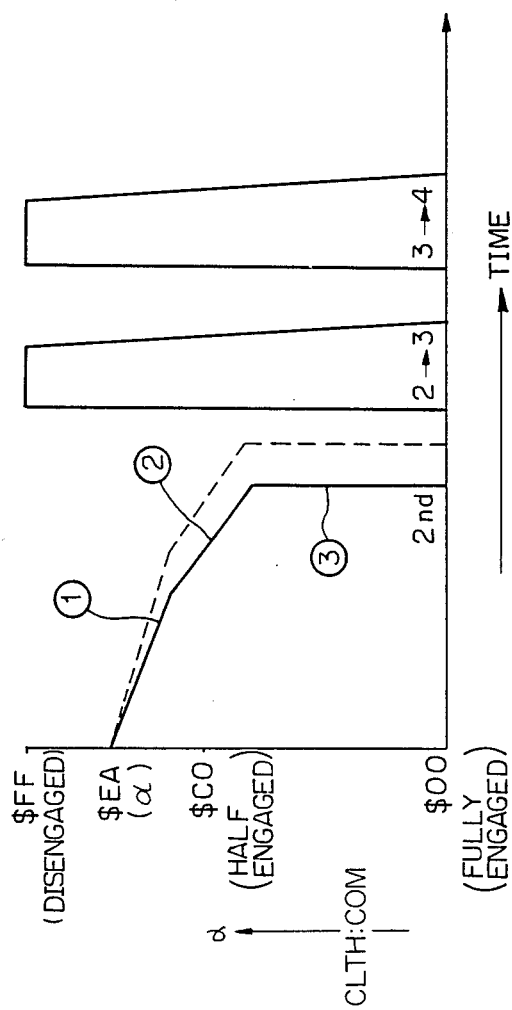
FIG. 3 is a view for explaining the clutch target position CLTH:COM in accordance with the present invention.

The change of the clutch target position CLTH:COM in the transition from a stopped state to an accelerated state of the vehicle is described hereinafter with reference to FIG. 3. In the graph of FIG. 3, the abscissa represents time and the ordinate represents values of the calculated clutch target position CLTH:COM. In FIG. 3, line ① represents a state at the beginning of the depression of the accelerator pedal, wherein the accelerator pedal depression and revolutional speed of the engine are low. In this state, the clutch target position CLTH:COM is calculated on the basis of the throttle opening in accordance with the flow chart of FIG. 2. The reference target position a is determined to be located at $EA as an initial value, as shown in FIG. 3.

Line ② represents a state wherein the revolutional speed of the engine 6 starts to rise causing the reserved variable A to modify and thereby reduce the difference (α-A). The clutch target position CLTH:COM changes accordingly and in this state, engine stalling and an overrun of the engine are prevented.

Line ③ represents a state wherein the value of the clutch target position CLTH:COM quickly approaches $00 as the input shaft revolution speed increases. In this state the clutch becomes fully engaged.

The graph represents the calculated clutch target position CLTH:COM for an authomatic clutch in a larger vechicle accelerating from a stopped state to a second, third, fourth, fifth, and sixth gear of the transmission. However, the graph can be applied to a medium or small vehicle. The dash-line in FIG. 3 represents the clutch target position CLTH:COM in a gradual acceleration state wherein the accelerator pedal depression movement is small. When the transmission is shifted, for example, from second gear to third gear or from third gear to fourth gear, the clutch target position CLTH:COM is reset to $FF (clutch disengagement), and then recalculated in accordance with the flow chart of FIG. 2 to control the clutch movement. Such an operation is shown as "2→3" or "3→4" in the graph.

An explanation of the load table 11, the engine revolution table 12, and the input shaft revolution table 13 will be made in detail hereinafter with reference to FIGS. 4(a) to 4(c).

Figure 4A:
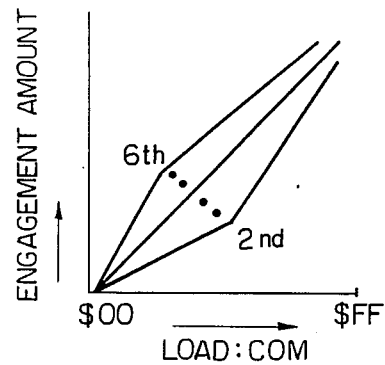
FIGS. 4(a) to 4(c) are views representing map table examples.

FIG. 4(a) shows a load table. The abscissa represents LOAD:COM, which corresponds to the throttle opening represented in the hexadecimal system from $00 to $FF. The ordinate represents the clutch engagement amount. The symbols "2nd" (low speed) to "6th" (high speed) represent shift positions of the transmission. The clutch engagement amount is read from the ordinate of the load table corresponding to a position on the abscissa designated by an address signal (from $00 to $FF) corresponding to the throttle opening detection signal from the load sensor 2.

Figure 4B:
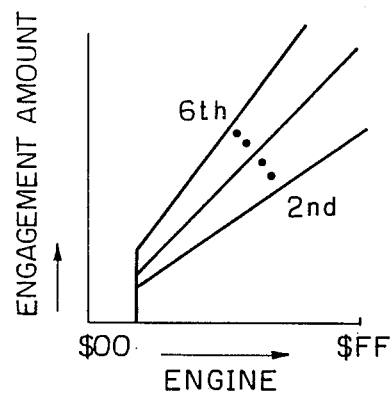

FIG. 4(b) shows an engine revolution table. The abscissa represents the ENGINE value corresponding to the engine revolution speed represented by the hexadecimal system from $00 to $FF, and the ordinate represents the clutch engagement amount. The clutch engagement amount is read from the ordinate of the engine revolution table corresponding to the position on the abscissa designated by an address signal (from $00 to $FF) corresponding to the engine revolutional speed detection signal from the engine revolution sensor 3.

Figure 4C:
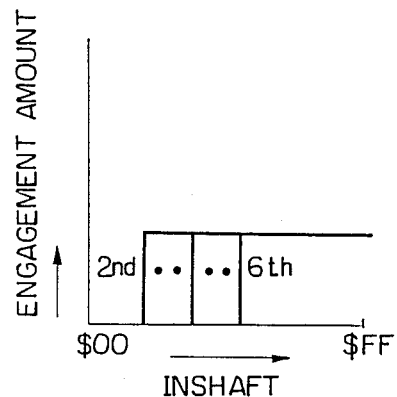

FIG. 4(c) shows an input shaft revolution table. The abscissa represents the INSHAFT value corresponding to the input shaft revolution speed represented by the hexadecimal system from $00 to $FF. The ordinate represents the clutch engagement amount. The clutch engagement amount is read from the ordinate corresponding to the position on the abscissa designated by an address signal (from $00 to $FF) corresponding to the input shaft revolution speed detection signal from the input shaft revolution sensor 4.

As mentioned above, in accordance with the present invention, the clutch target position is determined on the basis of the throttle opening, the engine revolution speed and the input shaft revolution speed, which makes it possible to control the clutch movement with a quick and accurate response to the accelerator pedal depression movement. Also, the same simple algorithm can be used for the slow start mode, ordinary start mode, and fast start mode to calculate the clutch target position and automatically control the clutch engagement.

FIG. 5 represents another construction of the principle of the present invention. A clutch actuator 1 drives a clutch 8 in accordance with the calculated clutch speed. A load sensor 2 detects the fuel amount supplied to an engine 6 by, for example, detecting the throttle opening of the engine; an engine revolution speed sensor 3 detects the revolutional speed of the engine 6; and an input shaft revolution sensor 4 detects the revolutional speed of an input shaft. A load table (1) 11, an engine revolution table 12, and an input shaft revolution table 13 are map tables for reading the clutch engagement amount registered beforehand, by using as address signals the throttle opening detection signal from the load sensor 2, the engine revolutional speed detection signal from the engine revolution sensor 3, and the input shaft revolutional speed detection signal from the input shaft revolution sensor 4, respectively.

A revolution speed difference table 14 is a map table for reading a clutch speed registered beforehand, by calculating the difference between the engine revolution speed and the input shaft revolution speed and using it as an address signal. A load table (2) 15 and an input shaft revolution table (2) 16 are tables for reading a clutch speed by using the throttle opening and the input shaft revolution speed as the address signals. A clutch engagement table 17 is a map table for reading a clutch engagement compensation coefficient registered beforehand, by using as an address signal the clutch position located between the half-clutch position and the fully engaged position. The various control operations are conducted through the control unit 10.

In FIG. 5, the clutch engagement amount is read from the load table (1) 11, in relation to an address signal corresponding to the throttle opening detected by the load sensor 2. Similarly, clutch engagement amounts are read from the engine revolution table 12 and the input shaft revolution table 13, in relation to address signals corresponding to the engine revolution speed and the input shaft revolution speed, detected by the engine revolution sensor 3 and the input shaft revolution sensor 4, respectively. Then, the total of the three read amounts is calculated and this total amount is used as the clutch target position.

After that, a clutch speed is read from the revolution difference table 14, the load table (2) 15 and the input shaft revolution table (2) 16, in response to address signals each corresponding to a difference between the engine revolution speed and the input shaft revolution speed, the throttle opening and the input shaft revolution speed, respectively. The highest clutch speed of the three read clutch speeds is used to control the clutch. If the clutch position corresponding to the highest clutch speed is smaller than $CO, which represents the half-clutch position, the clutch position is used as an address signal to read a clutch engagement compensation coefficient from the clutch engagement table 17. The highest clutch speed is multiplied by this compensation coefficient, and the clutch is controlled in accordance with the clutch speed multiplied by the compensation coefficient.

As mentioned above, first, the clutch target position is determined on the basis of the throttle opening, the engine revolution speed and the input shaft revolution speed. The clutch speed is calculated on the basis of the difference between the engine revolution speed, input shaft revolution speed, the throttle opening and the input shaft revolution speed. Then, the clutch speed is multiplied by the clutch engagement compensation coefficient to control the clutch. Therefore, it is possible to control the clutch with the use of one algorithm for the slow speed mode, start mode, and shift mode.

A movement of the clutch from the disengaged state to the fully engaged state when the accelerator pedal is depressed is described hereinafter.

In FIG. 5, when an accelerator pedal (not shown) is depressed, the load actuator 7 opens the throttle to supply fuel or a mixture of fuel and air to the engine 6, and the load sensor 2 detects the throttle opening and transmits a detection signal to the control unit 10. The control unit 10 then reads the clutch engagement amount registered beforehand in the load table (1) 11 in accordance with an address signal corresponding to the throttle opening.

Similarly, the engine revolution sensor 3 detects the engine revolution speed, which rises slightly after the throttle is opened, and transmits the detection signal to the control unit 10. The control unit 10 reads the clutch engagement amount registered beforehand in the engine revolution table 12 in relation to an address signal of the engine revolution speed.

Also, the input shaft revolution sensor 4 detects the input shaft revolution speed and transmits the detection signal to the control unit 10. The control unit 10 reads the clutch engagement amount registered beforehand in the input shaft revolution table (1) 13 in relation to an address signal corresponding to the input shaft revolution speed.

The total of the three read clutch engagement amounts is then calculated. This total amount represents the clutch target position. Then, the clutch speed is calculated on the basis of this total amount to control the clutch engagement, thereby enabling a smooth clutch engagement with an accurate response to the depression movement of the accelerator pedal.

A transmission actuator 9 illustrated in FIG. 5 functions to change the shift position of the transmission. A speed sensor 5 detects the vehicle speed by detecting the output shaft revolution speed.

Figure 6:
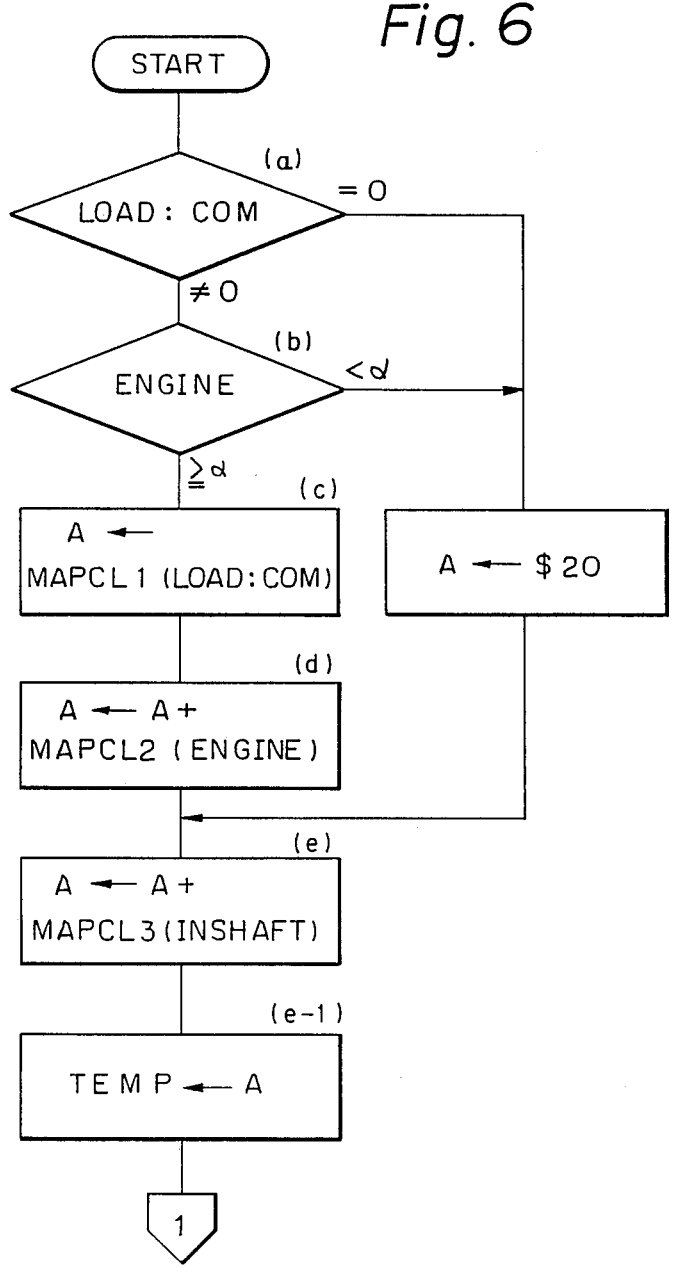
FIGS. 6 to 10 are flow charts representing the function of the present invention.

A process for determining the clutch target position is described hereinafter with reference to the flow chart of FIG. 6.

At step (a), it is determined whether or not the LOAD:COM is "0". The LOAD:COM is a throttle opening input variable converted from the accelerator pedal opening detection signal and represented in hexadecimal from $00 to $FF. If the answer is YES, that is, the accelerator pedal is not depressed, and therefore, the throttle opening is zero, the reserved variable A is modified to a value $20 (i.e., the sum of the clutch engagement amounts based on the throttle opening and the engine revolution speed is assumed to be $20) and the process goes to step (e). If the answer is NO at step (a), the process goes to step (b).

At step (b) it is determined whether or not the ENGINE is less than $\alpha$. ENGINE is an engine revolution input variable converted from the engine revolution speed detection signal of engine revolution sensor 3 and represented in the hexadecimal system from $00 to $FF. If the answer is YES, the reserved variable A is modified to the value of $20 (i.e., the sum of the clutch engagement amounts based on the throttle opening and the engine revolution speed is assumed to be $20) and the process goes to step (e). If the answer is NO at step (b), the process goes to step (c).

At step (c) a MAP CL1 (LOAD:COM) is added to modify the reserved variable A. The MAP CL1 is a function relating to the LOAD:COM and represents an increased amount of the clutch engagement corresponding to the throttle opening. In other words, in step (c), the clutch engagement amount is read from the ordinate of the load table (1) 11 in relation to the LOAD:COM value ($00 to $FF) on the abscissa. Accordingly, a target clutch engagement amount on the basis of the throttle opening corresponding to the accelerator pedal depression is calculated.

At step (d) a MAP CL2 (ENGINE) is added to the reserved variable A, to modify the same. ENGINE is an engine revolution input variable converted from the engine revolution speed detection signal of the engine revolution sensor 3 and represented by the hexadecimal system from $00 to $FF. The MAP CL2 is a function relating to the ENGINE and represents an increased amount of the clutch engagement corresponding to the engine revolution speed. In other words, in step (d), the clutch engagement amount is read from the ordinate of the engine revolution table 12 of FIG. 5 in relation to the ENGINE value ($00 to $FF) on the abscissa and added to the reserved variable A to modify the same. Accordingly, the clutch engagement amount on the basis of the engine revolution speed is calculated, enabling an avoidance of engine stalling.

At step (e), a MAP CL3 (INSHAFT) is added to the reserved variable A, to modify the same. INSHAFT is an input shaft revolution input variable converted from the input shaft revolution speed detection signal from the sensor 4 and represented by the hexadecimal system from $00 to $FF. MAP CL3 is a function relating to INSHAFT and represents an increased amount of the clutch engagement corresponding to the input shaft revolution speed. In other words, in step (e), the clutch engagement amount is read from the ordinate of the input shaft revolution table 13 of FIG. 5 in relation to the INSHAFT valve ($00 to $FF) on the abscissa and added to the reserved variable A to modify the same. Accordingly, a clutch engagement amount on the basis of the input shaft revolution speed is calculated.

At step (e-1), a register TEMP is loaded with the value registered in the reserved variable A, (i.e., the total of the clutch engagement amounts calculated on the basis of the throttle opening) the engine revolution speed and input shaft revolution speed, respectively. This clutch target position is derived from the following formula.

$$
\begin{aligned}
\text{CLTH:COM} &= \alpha - A \\
&= \alpha - [\text{MAP CL1 (LOAD:COM)} \\
&\quad + \text{MAP CL2 (ENGINE)} \\
&\quad + \text{MAP CL3 (INSHAFT)}] \ldots (1)
\end{aligned}
$$

wherein LOAD:COM is a value corresponding to the throttle opening, ENGINE is a value corresponding to the engine revolution speed, INSHAFT is a value corresponding to the input shaft revolution speed, $\alpha$ is the reference value corresponding to the clutch position located beyond the half-clutch position toward the disengaged side, and CLTH:COM is a value representing the clutch target position to be determined.

A process for calculating the clutch speed is described in detail hereinafter with reference to FIGS. 7 to 9.

Figure 7:
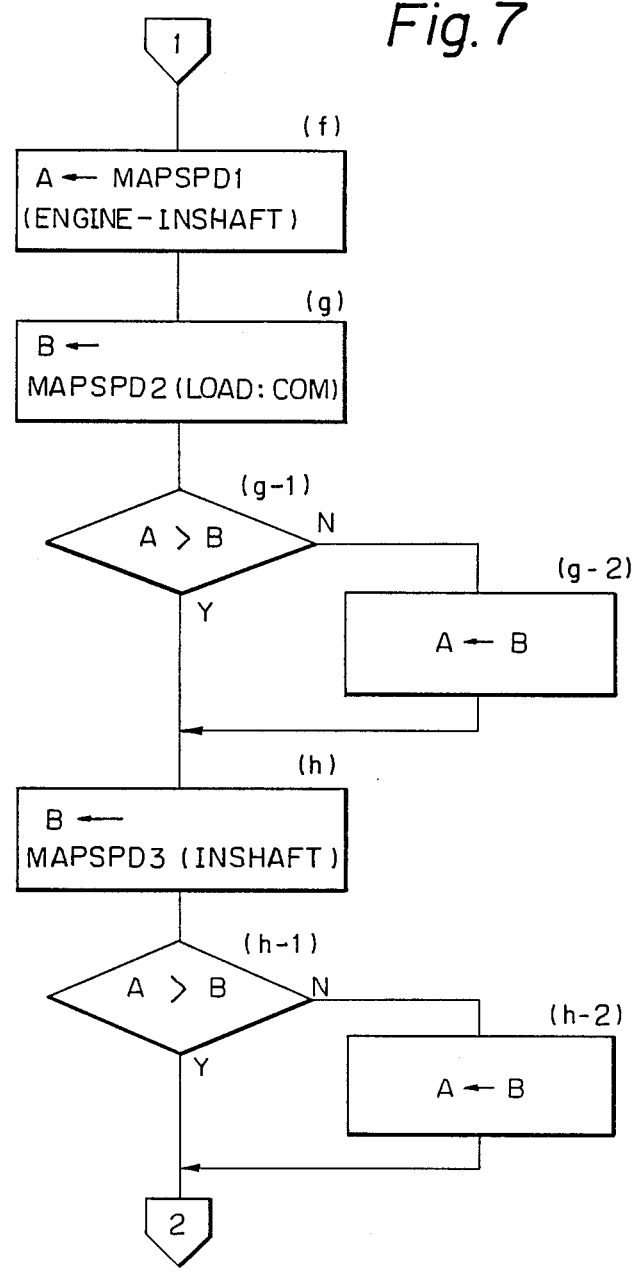

At step (f) of the flow chart of FIG. 7, a MAP SPD1 (ENGINE-INSHAFT) is added to the reserved variable A. ENGINE-INSHAFT is a revolution difference input variable corresponding to the difference between the engine revolution speed and the input shaft revolution speed and represented by the hexadecimal system from $00 to $FF. MAP SPD1 is a function relating to ENGINE-INSHAFT and represents the clutch speed in relation to the difference between the engine revolution speed and the input shaft revolution speed. In other words, in step (f), the clutch speed is read from the ordinate of the revolution difference table 14 of FIG. 5 and the read clutch speed is substituted for the register A. Accordingly, the clutch speed in relation to the difference between the engine revolution speed and the input shaft revolution speed is calculated.

At step (g), a MAP SPD2 (LOAD:COM) is loaded into a register B. LOAD:COM is a throttle opening input variable as described before and represented by the hexadecimal system from $00 to $FF. MAP SPD2 is a function relating to LOAD:COM and represents the clutch speed corresponding to the throttle opening. In other words, in step (g), the clutch speed is read from the ordinate of the load table (2) 15 of FIG. 5 in relation to the LOAD:COM value ($00 to $FF) on the abscissa and the read clutch speed is loaded into the register B. Accordingly, the clutch speed in relation to the throttle opening is calculated.

At step (g-1), it is determined whether or not the value registered in the register A is larger than the value registered in the register B. If the answer is YES, the process goes to step (h). If the answer is NO, the register B value is loaded into the register A in step (g-2). Accordingly a larger value of the clutch speeds calculated in step (f) and step (g) is registered in the register A.

At step (h), a MAP SPD3 (INSHAFT) is loaded into the register B. INSHAFT is an input shaft revolution input variable, as described before, and represented by the hexadecimal system from $00 to $FF. MAP SPD3 is a function relating to INSHAFT and represents the clutch speed on the basis of the input shaft revolution speed. In other words, in step (h), the clutch speed is read from the ordinate of the input shaft revolution table (2) 16 in relation to the INSHAFT value ($00 to $FF) on the abscissa and the read value of the clutch speed is loaded into the register B. Accordingly, the clutch speed on the basis of the input shaft revolution speed is calculated.

At step (h-1), it is determined whether or not the value registered in the register A is larger than the value registered in the register B. If the answer is YES, the process goes to step (i) of FIG. 8. If the answer is NO, the value of the register B is loaded into the register A. Accordingly, the largest value of the clutch speeds calculated in steps (f), (g) and (h) is registered in the register A.

Figure 8:
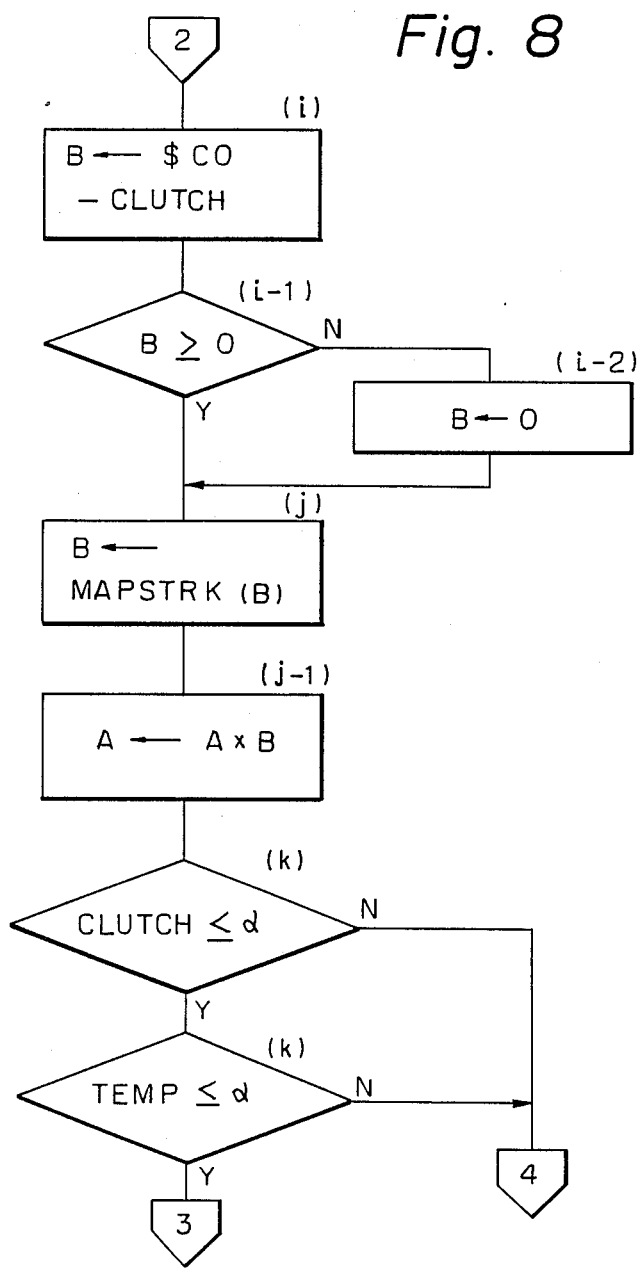

At step (i) of the flow chart of FIG. 8, $CO-CLUTCH is substituted for the value in the register B.

At step (i-1), it is determined whether or not the value registered in the register B is equal to or larger than zero. If the answer is YES, the process goes to step (j). If the answer is NO, the zero value is registered in the register B in step (i-2) and the process goes to step (j).

At step (j), a MAP STRK (B) is loaded into the register B. The value of B is the value calculated in step (i) or the zero value registered in step (i-2). MAP STRK is a function relating to B and represents a clutch engagement compensation coefficient corresponding to the value of $CO (half-clutch position) minus CLUTCH (clutch position). In other words, in step (j) the clutch engagement compensation coefficient is read from the ordinate of the clutch engagement table 17 of FIG. 5 in relation to the CLUTCH value ($00 to $FF) on the abscissa and the read value is registered in the register B. Accordingly, the clutch engagement compensation coefficient is calculated in relation to the difference of the clutch position from the half-clutch position.

At step (j-1), the highest clutch speed registered in the register A is multiplied by the clutch engagement compensation coefficient registered in the register B and the calculated value is loaded into the register A.

Figure 9:
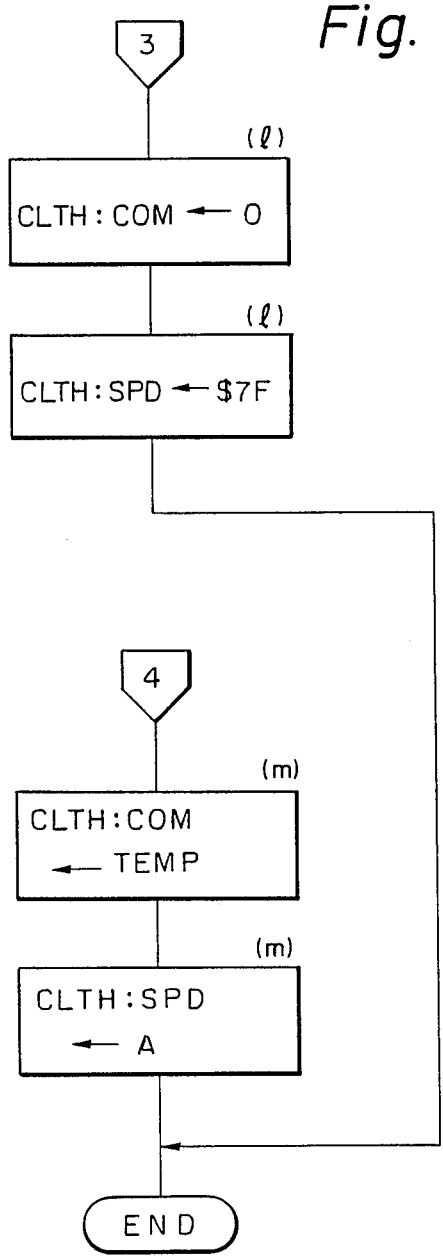

At step (k), when CLUTCH (clutch position) is equal to or smaller than (at the engagement side) the predetermined reference $\alpha$, and TEMP (clutch target position) is equal to or smaller than the predetermined reference $\alpha$, the clutch is shifted to the fully engaged position in steps (1) of FIG. 9. In other cases, TEMP (clutch target position) and A (clutch shift speed) are registered in steps (m) of FIG. 9. Then, the clutch is controlled at predetermined periods of, for example, 32 ms, in accordance with the calculated clutch target position and the clutch speed, according to the process described later with reference to FIG. 10.

Figure 10:
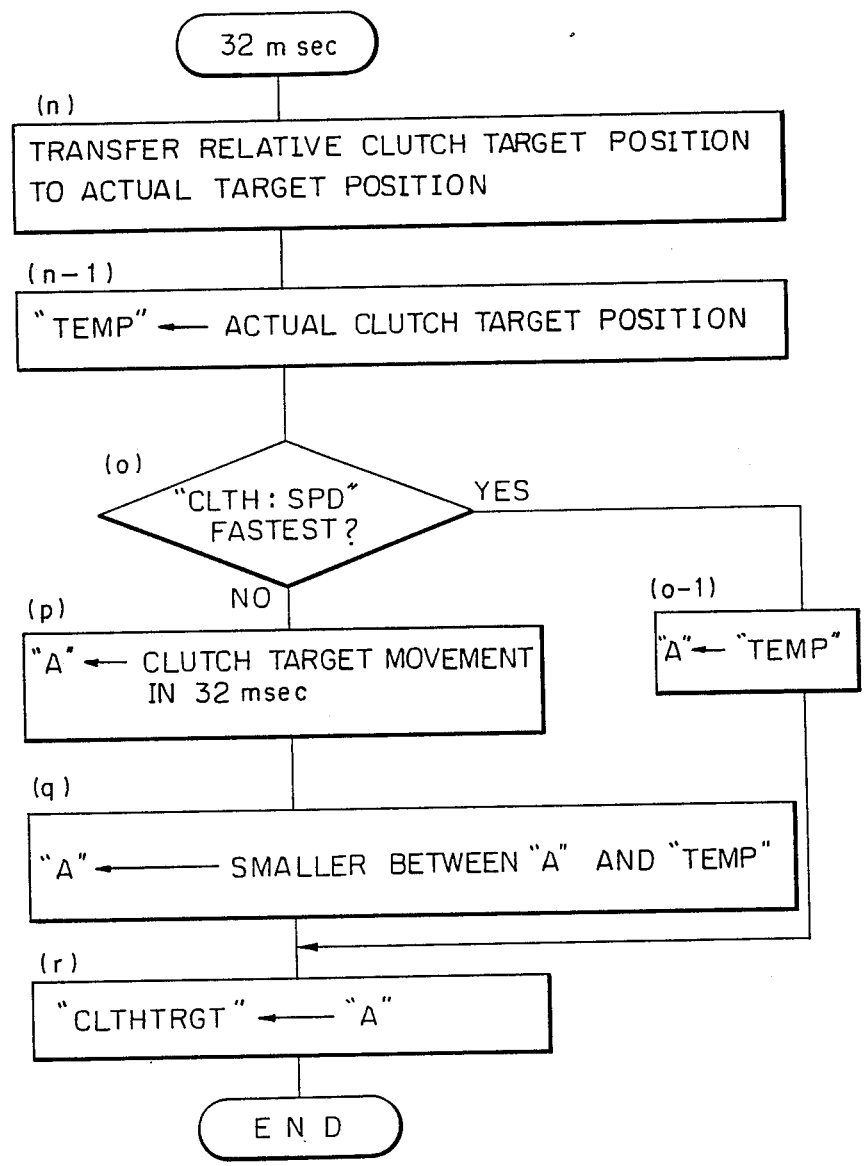

At step (n) of the flow chart of FIG. 10, the relative clutch target position is converted to an actual target position.

At step (n-1), the actual clutch target position is loaded into the register TEMP.

At step (o), it is determined whether CLTH:SPD (clutch-shift speed) is the highest speed of $7F or $FF. If the answer is YES, the clutch target position registered in the register TEMP is substituted for the value registered in the register A, in step (o-1), and the process then goes to step (r). If the answer is NO, the process goes to step (p).

At step (p), the clutch target position to which the clutch is shifted in the predetermined period of, for example, 32 ms, is calculated and the calculated value is substituted for the value registered in the register A.

At step (q), the smaller of the values registered in the register A and the register TEMP is registered in the register A.

At step (r), the value of the register A is loaded into the register CLTHTRGT (actual clutch position). Accordingly, the actual clutch target position after 32 ms is loaded into the register CLTHTRGT and the clutch 8 is moved to that position.

As mentioned above, in accordance with the present invention, the target clutch position is determined on the basis of the throttle opening, the engine revolution speed and the input shaft revolution speed, and further, the clutch speed is determined on the basis of the difference between the engine revolution speed and the input shaft revolution speed, the throttle opening and the input shaft revolution speed. Therefore, the clutch is precisely controlled in response to the depression movement of the accelerator pedal, and the clutch control can be conducted with the use of only one algorithm.

Figure 11:
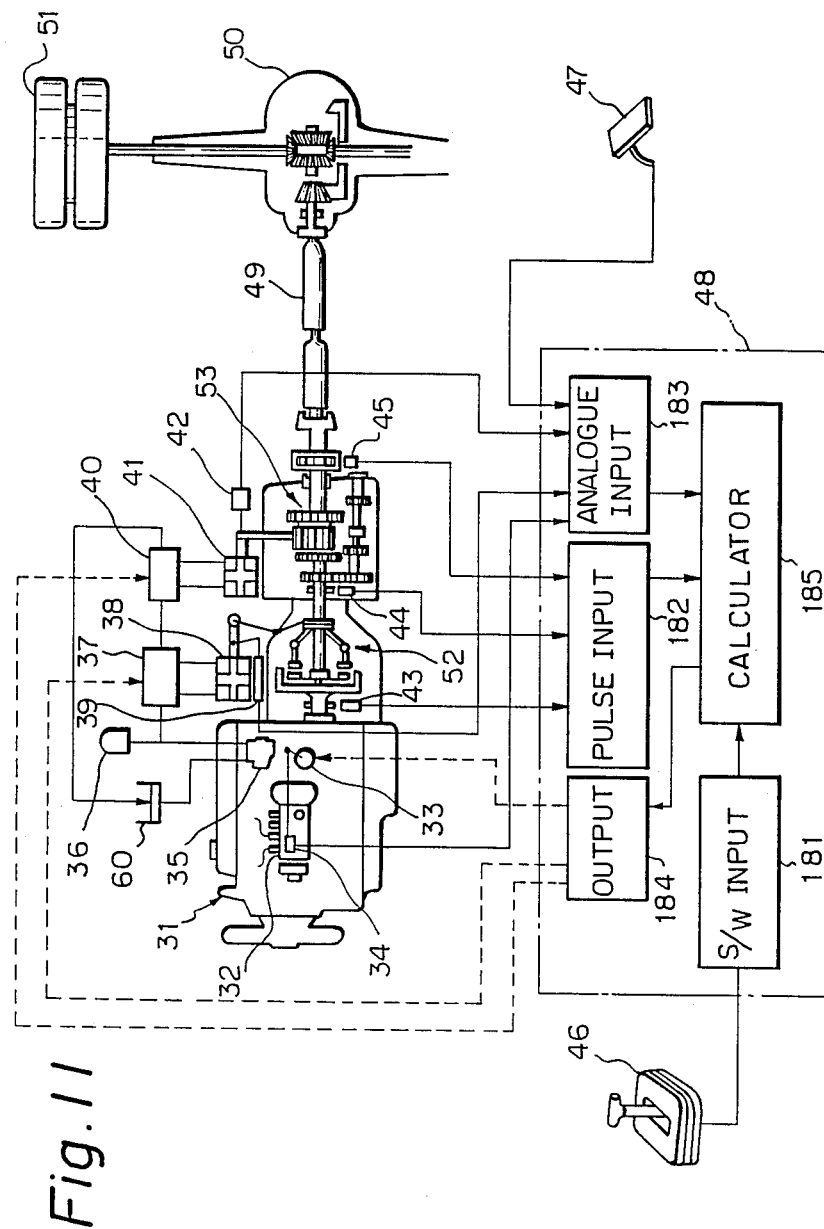
FIG. 11 is a constructional view of an embodiment of the present invention.

FIG. 11 illustrates an example of the vehicle construction to which the present invention is applied. An output of an engine 31 is transferred to a transmission 53 and a drive shaft 49 through a dry single plate type clutch 52. The drive power is transmitted to tires 51 through a differential 50. The engine 31 is provided with a fuel injection pump 32 for controlling the engine output, and a stepper motor 33 is provided for controlling the engine output by controlling the fuel injection amount. The fuel injection amount is detected by a load sensor 34 through a rod. A clutch actuator 38 is connected to the clutch 52 with a clutch release fork, and a clutch stroke sensor 39 is connected to the clutch actuator 38. The clutch actuator is driven by supplying a high pressure oil from an oil pump 35 to a cylinder through a combined movement of a clutch valve 37 to control a clutch disc through the clutch release fork, thus changing the engine power to be transmitted. The clutch stroke sensor 39 detects the shift amount of the clutch by detecting the movement of the release bearing. The transmission 53 multiplies the engine power transmitted through the clutch, and the gear position is changed by supplying a gear actuator 41 connected to a gear fork with oil pressure through a gear valve 40. The engine power is transmitted to the drive shaft 49, differential 50 and tires 51 from the transmission 53. An engine revolution speed sensor 43 detects the revolution speed of the engine 31, an inshaft sensor 44 detects the revolution speed of an input shaft of the transmission, and a vehicle sensor 45 detects the revolution speed of the drive shaft 49. The above-mentioned sensors are connected to a pulse input portion 182 of a control unit 10. The load sensor 34, the clutch stroke sensor 39 and the gear stroke sensor 42 are connected to an analog input portion 183. An accelerator sensor 47 attached to an accelerator pedal detects the movement of the accelerator pedal depressed by the driver. The accelerator sensor 47 is connected to the analog input portion 183. A selector lever 46 is provided for selecting the gear position of the transmission and connected to an S/W input portion 181.

When the vehicle is to be started, the driver shifts the selector lever 46 to a proper position, and the control unit 10 detects the selector lever position through the S/W input 181. A calculator 185 drives the gear valve 40 through an output 184 so that the gear actuator 41 is driven by the oil pressure; the gear stroke sensor 42 detects the gear position; and the accelerator sensor 47 detects the movement of the accelerator pedal depressed by the driver and transmits the detection signal to the analog input portion 183. Also, the detection signals of engine revolution speed, input shaft revolution speed and the vehicle speed are transmitted to the analog input portion 183 to calculate the clutch engagement amount in accordance with the present invention. The calculated clutch engagement amount is transmitted to the output portion 184, thereby driving the clutch valve 37 which drives the clutch actuator 38 to connect the clutch disc to start the vehicle.

FIG. 12(a) and 12(b) are a block diagram of the control unit 10. The calculator 185 comprises a central processing unit 1851, a read only memory (ROM) 1852, and a random access memory (RAM) 1853 for temporarily memorizing data and serving as a buffer area to an adjacent portion 186. The input circuit 182 comprises a pulse input portion to detect the vehicle speed pulse, engine revolution pulse and the input shaft revolution pulse. An analog input portion 183 detects the analog signals of the accelerator pedal depression amount, the gear stroke and the clutch stroke, and an S/W input portion 181 detects the shift position of the selector lever. An output portion 184 comprises output transistors to directly drive the clutch valve, gear valves and the stepper. The adjacent circuit 186 comprises a 5 V-power a powersource ON detection circuit, a reset circuit, an overpower detection circuit, and an over-run detection circuit.

Figure 13:
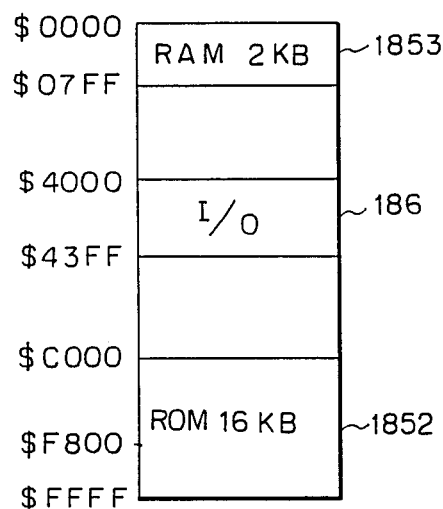
FIG. 13 is a view representing a memory map used in the circuits of FIG. 12.

FIG. 13 illustrates a memory map including a ROM 1852 and RAM 1853 and having an address area of 64 K. The RAM, I/O device, and ROM are disposed in the areas from $0000 to $07FF, from $4000 to $43FF, and from $C000 to $FFFF, respectively. The area from $C000 to $F800 of the ROM is a program area memorizing process sequences, the area from $F800 to $FFFF is a data area, and the magnetic valve, relay, and stepper motor can be driven by accessing the I/O area.

Figure 14:
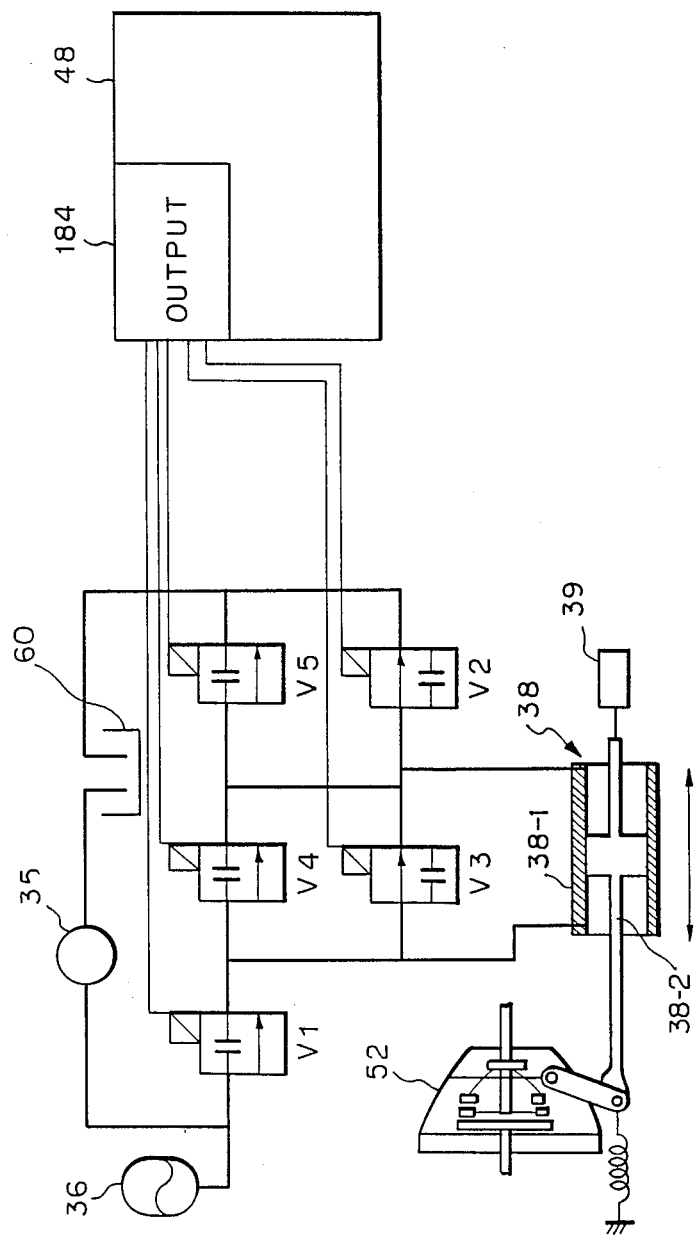
FIG. 14 is a view representing a hydraulic system for driving the clutch in accordance with the present invention.

FIG. 14 illustrates a hydraulic circuit comprising the clutch valve 37 of FIG. 11 including the clutch actuator 38, and the clutch 52. Each of the magnetic valves V1 to V5 electrically opens and closes the high pressure oil passage connected from the oil pump 35. The clutch actuator 38 comprises a cylinder 38-1 and a piston 38-2. The high pressure oil is introduced into the cylinder 38-1 through the five magnetic valves V1 to V5 to control the speed and the direction of the movement of the piston 38-2, thus controlling the movement of the clutch 52. The clutch position is detected by a clutch stroke sensor 39 attached to the clutch actuator 38. The clutch position detection signal is transmitted to the analog input portion of the control unit 10.

A process for controlling the clutch is described in detail hereinafter with reference to FIGS. 15(a) to 15(f).

Figure 15A:
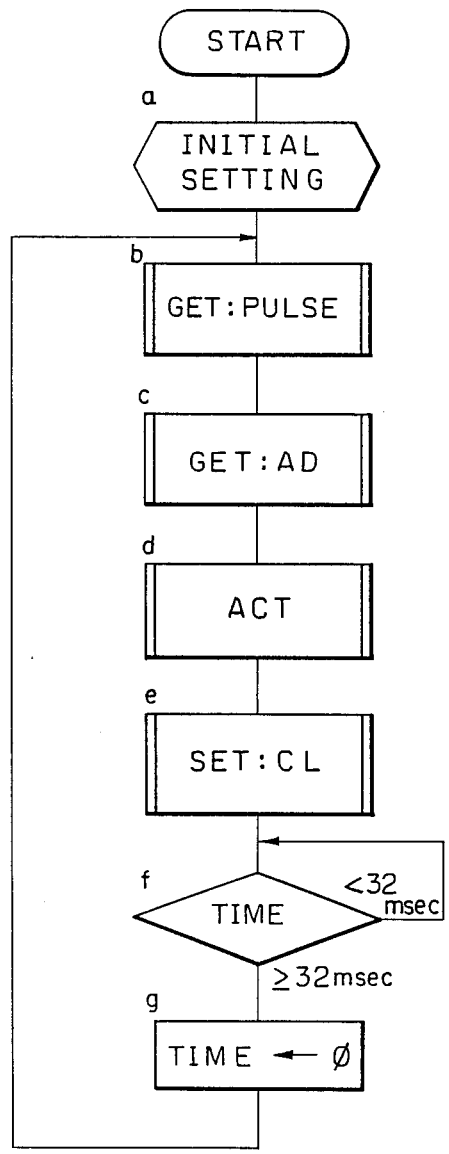
FIGS. 15-a to 15-f are flow charts representing the function of the present invention.

At step (a) of the flow chart of FIG. 15(a), an initial setting routine is carried out wherein the RAM is cleared and the input and output ports are set to the initial state.

Figure 15B:
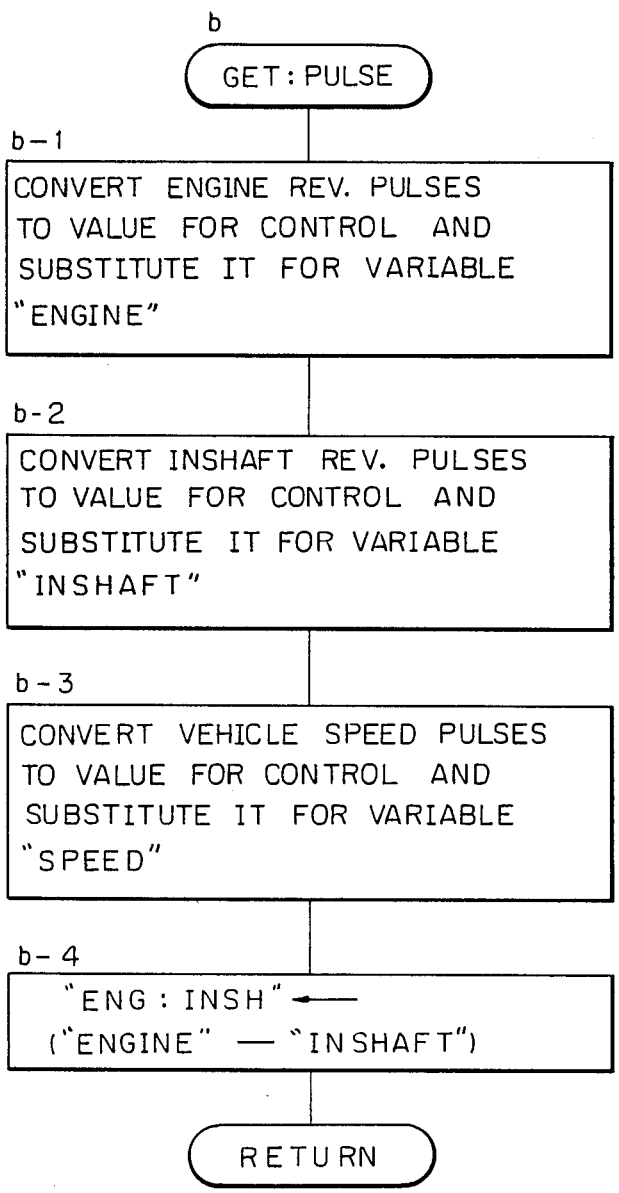

At step (b) of the flow chart of FIGS. 15(a) and 15(b), the detection pulses from the engine revolution sensor, input shaft revolution sensor, and the vehicle speed sensor are converted to control signals.

At step (b-1) of the flow chart of FIG. 15(b), the output pulses from the engine revolution sensor are counted for a predetermined time and converted to a control signal which is substituted for the variable ENGINE. ENGINE represents 0 to 3520 rpm by one BYTE and the least significant bit represents 13.75 rpm.

At step (b-2) of the flow chart of FIG. 15(b), the output pulses from the input shaft revolution sensor are counted for a predetermined time and converted to a control signal which is substituted for the variable INSHAFT. INSHAFT represents 0 to 3520 rpm by one BYTE and the least significant bit represents 13.75 rpm.

At step (b-3) the output pulses from the vehicle speed sensor are counted for a predetermined time and converted to a control signal which is substituted for the variable SPEED. The SPEED represents 0 to 128 km/h by one BYTE and the least significant bit is 0.5 km/h.

At step (b-4) the difference between the variable ENGINE and the variable INSHAFT is calculated and the calculated value is substituted for the variable ENG:INSH.

Figures 1, 15C:
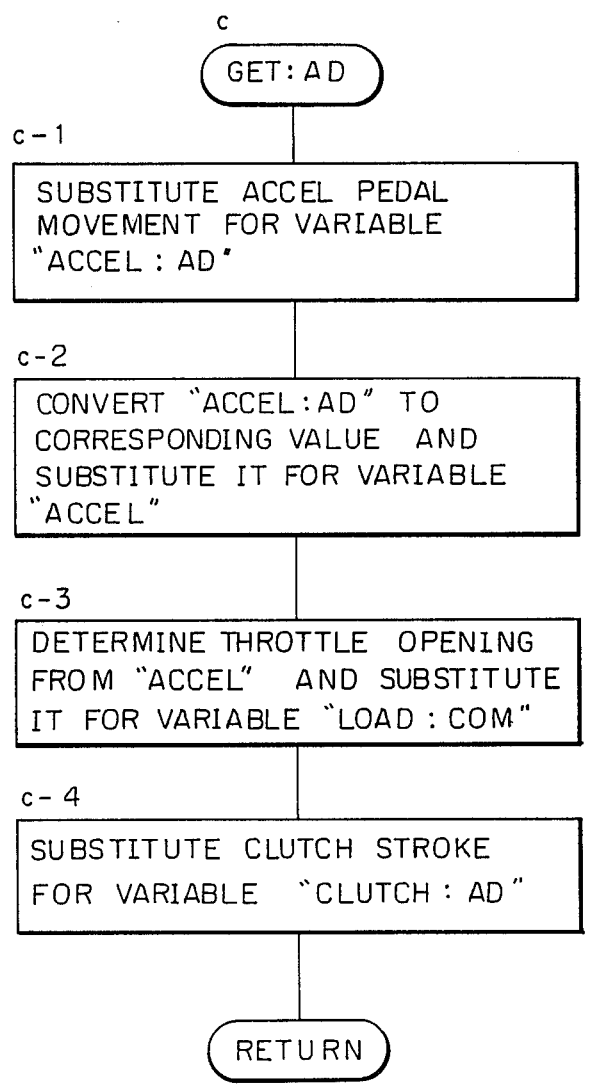
Figures 2, 15C:
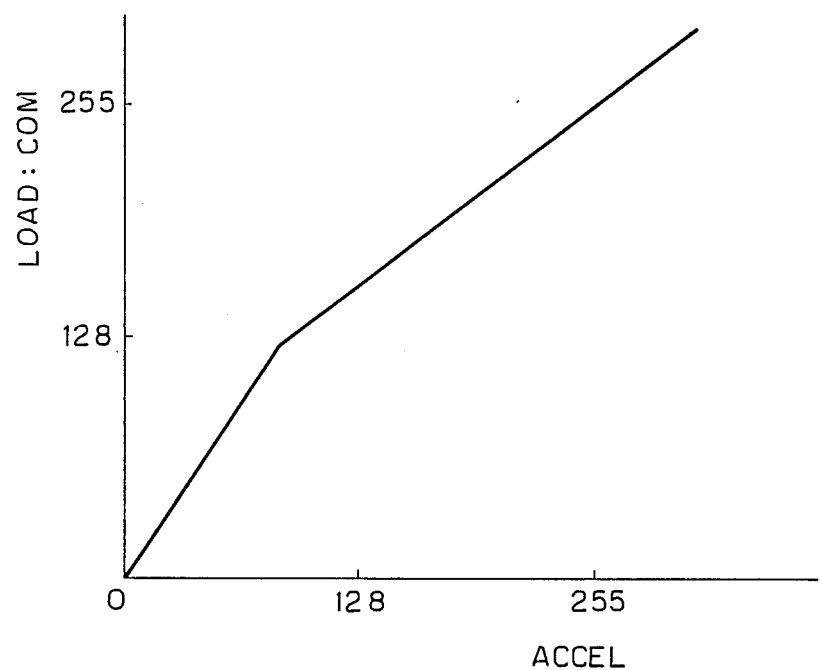

At step (c) of the flow chart of FIG. 15(c)-1 the analog signal from the analog input circuit is converted to a digital signal and registered in the RAM area.

At step (c-1) the analog detection signal of the accelerator pedal depression amount from the accelerator sensor is converted to a digital signal and the converted value is substituted for the variable ACCEL:AD.

FIG. 15(c)-2 represents a map table representing the relationship between LOAD:COM and ACCEL and determining the throttle opening from the accelerator pedal depression amount.

At step (c-2), the value of the variable ACCEL:AD is converted to a corresponding relative value with reference to a predetermined acceleration idle voltage and full acceleration voltage. The converted value is registered in ACCEL, and the variable ACCEL is represented by one BYTE wherein "0" designates the idle position and "255" designates the full acceleration position.

At step (c-3), the target stepper number of the step motor 3 is registered in the variable LOAD:COM to drive the motor by the target steps. For the LOAD-COM symbol, "0" represents an idle position and "255" represents a full acceleration position, for ACCEL.

At step (c-4), the control unit detects the clutch stroke detection voltage transmitted to the analog input circuit from the clutch stroke sensor attached to the clutch actuator through the rod and converts and registers the detection voltage in the register CLUTCH:AD.

Figure 18:
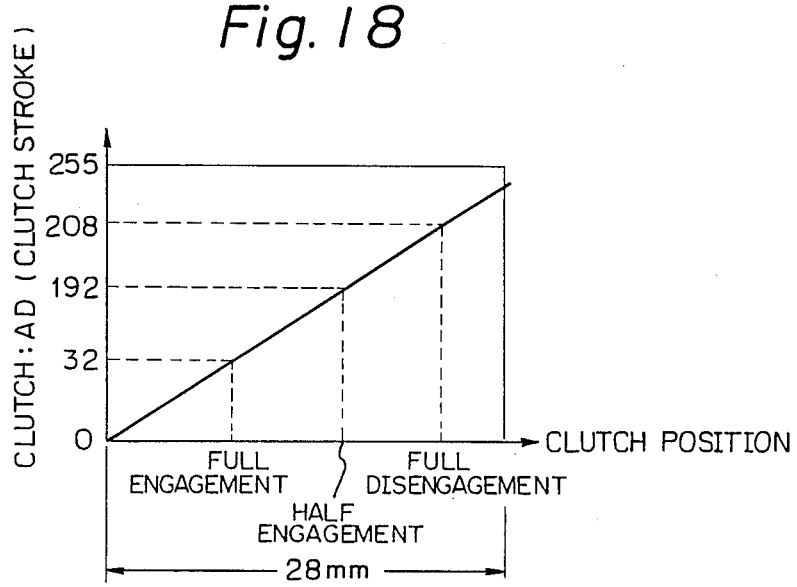
FIG. 18 is a graphical view representing a clutch stroke in relation to a clutch position.

FIG. 18 represents an example of a map table for representing the relationship between the CLTCH:AD and the clutch position. The movement range of the clutch actuator is 28 mm, which is divided into 256 segments.

Figure 15D:
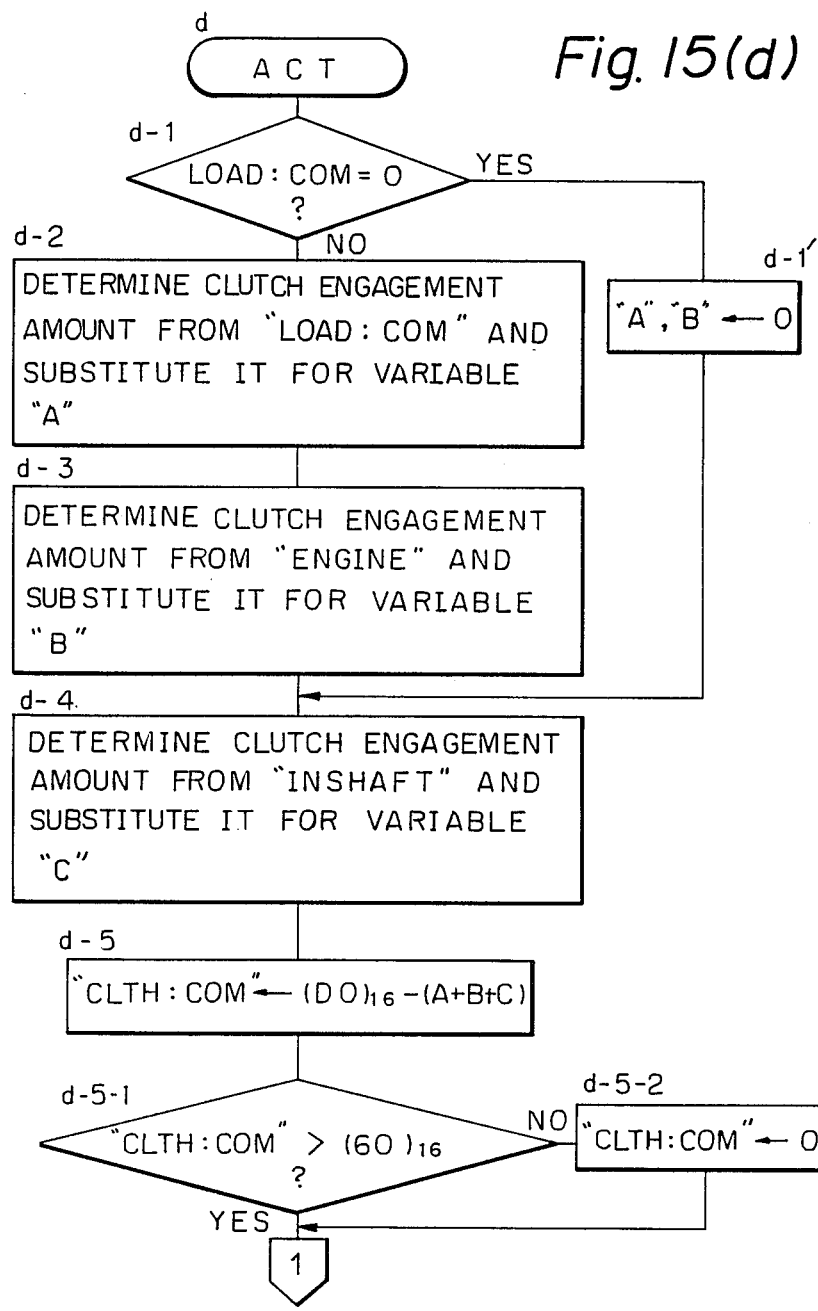
Figure 15E:
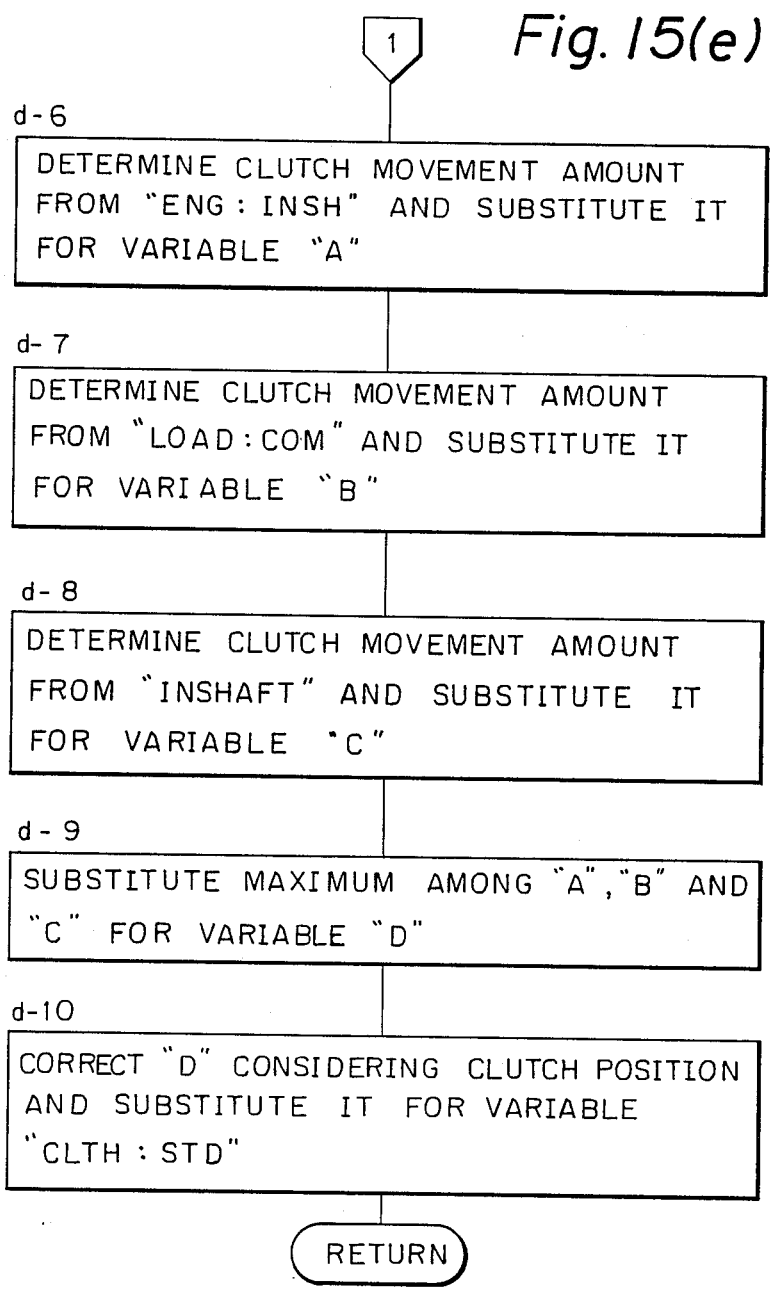

At step (d) of the flow chart of FIG. 15(d), the clutch position and the clutch speed are determined on the basis of the detection signals.

At step (d-1), it is determined whether or not the variable LOAD:COM is "0". If the answer is YES, i.e., the engine idle state, "0" is registered in the registers A and B, in step (d-1') and only the input shaft revolution is considered to determine the clutch engagement amount. If the answer is NO, the process goes to step (d-2).

At step (d-2) the clutch engagement amount is read from a map table in relation to the LOAD:COM value, i.e., the accelerator pedal depression amount.

Figure 16A:
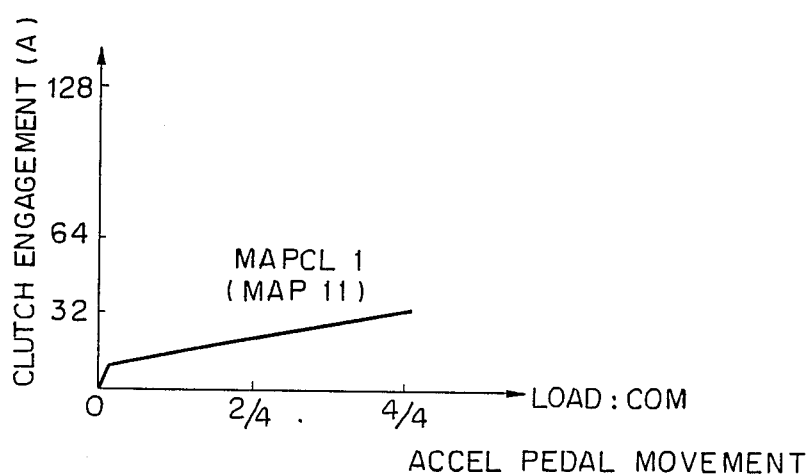
FIGS. 16(a) to (c) and FIGS. 17(a) to (b) are views representing map table examples according to the present invention.

FIG. 16(a) represents an example of the map (MAPCL1) for reading the clutch engagement amount in relation to the accelerator pedal depression amount. The read amount is registered in the variable A.

Figure 16B:
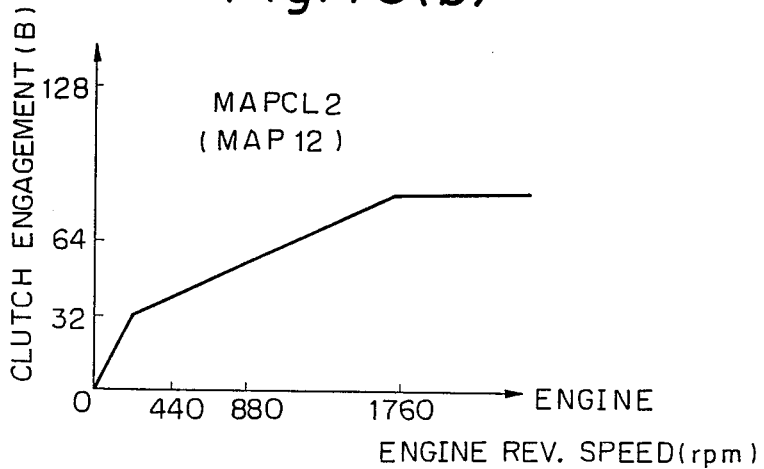

At step (d-3), the clutch engagement amount in relation to the ENGINE value, i.e., the engine revolution speed, is read from a map table (MAPCL2) of FIG. 16(b) which represents the clutch engagement amount in relation to the engine revolution speed. The speed clutch engagement amount is substituted for the value in the register B.

Figure 16C:
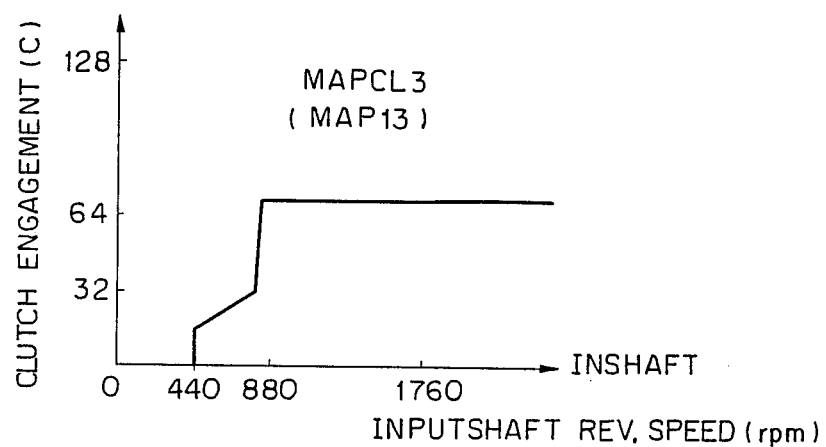

At step (d-4), the clutch engagement amount in relation to the INSHAFT value, i.e., the input shaft revolution speed, is read from a map table (MAPCL3) of FIG. 16(c), which represents the clutch engagement amount in relation to the input shaft revolution speed. The read clutch engagement amount is substituted for the value in the variable C.

At step (d-5) the total of the variables A, B and C, each representing a clutch engagement amount in relation to a specific parameter is calculated, and the total amount is substracted from the reference point $(D0)_{16}$, which represents the clutch disengaged position. The calculated value is stored as the variable CLTH:COM, which represents the clutch target position. The CLTH:COM is represented by numerals 0 to 255, wherein 0 represents the fully engaged state and 255 represents the fully disengaged state.

At steps (d-5-1) and (d-5-2), when CLTH:COM is below $(60)_{16}$, 0 is substituted for the CLTH:COM to fully engage the clutch. Therefore, the control range of the clutch target position is between $(D0)_{16}$ and $(60)_{16}$ of the CLTH:COM.

Figure 17A:
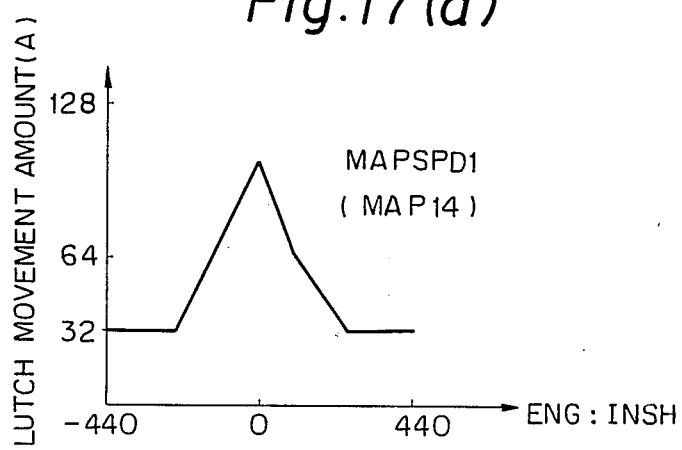

At step (d-6), the clutch shift amount is read from a map table (MAPSPD1) of FIG. 17(a) in relation to the variable ENG:INSH, i.e., the difference between the engine revolution speed and the input shaft revolution speed, and the read amount is substituted for the variable A.

As shown in MAPSPD1 of FIG. 17(a), the clutch shift amount becomes larger as the difference between the engine revolution speed and the input shaft revolution speed becomes smaller.

Figure 17B:
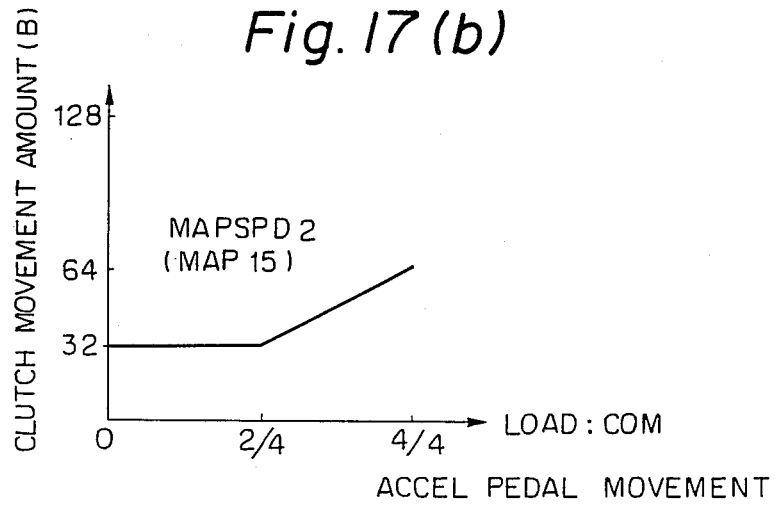

At step (d-7), the clutch shift amount is read from a map table (MAPSPD2) of FIG. 17(b) in relation to the LOAD:COM (accelerator pedal depression amount), and the read amount is substituted for the variable B.

As shown in FIG. 17(b), the clutch shift amount becomes larger as the accelerator pedal depression amount becomes larger.

Figure 17C:
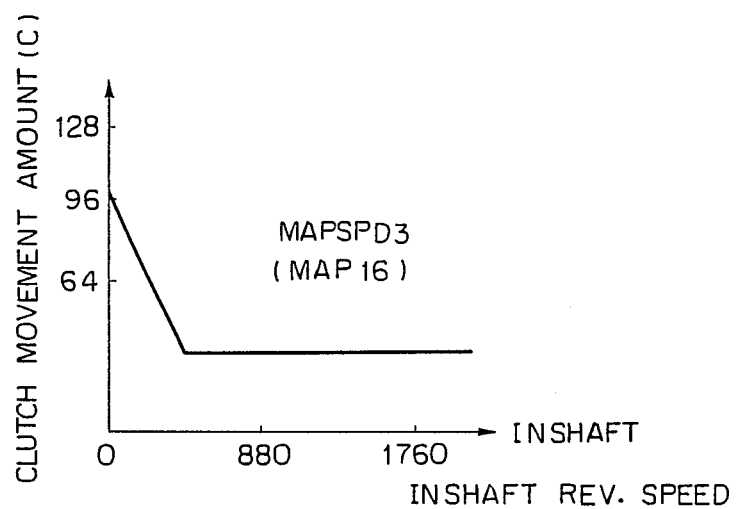

At step (d-8), the clutch movement amount is read from a map table (MAPSPD3) of FIG. 17(c), and the read amount is substituted for the variable C.

As shown in the MAPSPD3 of FIG. 17(c), the clutch speed becomes higher as the input shaft revolution speed becomes slower.

At step (d-9), the largest value among the three variables A, B and C is calculated, and the calculated result is substituted for the variable D. Therefore, the largest movement amount is always used for controlling the clutch.

At step (d-10), the variable D is compensated in accordance with the actual clutch position, and the corrected variable D is substituted for CLUTCH:AD.

Figure 19:
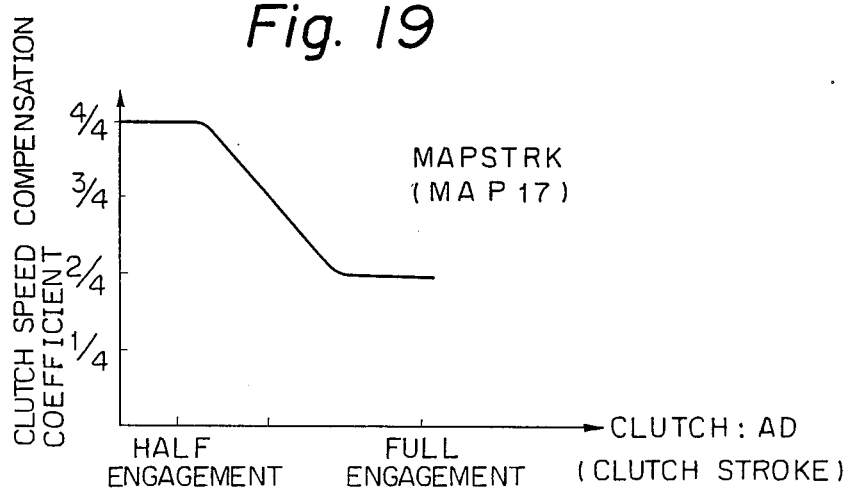
FIG. 19 is a graphical view representing a clutch speed compensation coefficient.

FIG. 19 represents a map table for reading the compensation coefficient in relation to the CLUTCH:AD (clutch stroke). The clutch speed is calculated from the formula CLTH:SPD=D×MAPSTRK (CLUTCH:AD). As can be seen from the graph of FIG. 19, the clutch speed is not compensated near the half-clutch position, and is about 50% lower near the fully engaged position. The most significant bit of the CLTH:SPD represents the direction of the clutch movement; $(7F)_{16}$ represents the engagement movement at the highest speed; $(FF)_{16}$ represents the disengagement movement at the fastest speed; and, $(00)_{16}$ or $(80)_{16}$ represents a halted state.

Figure 15F:
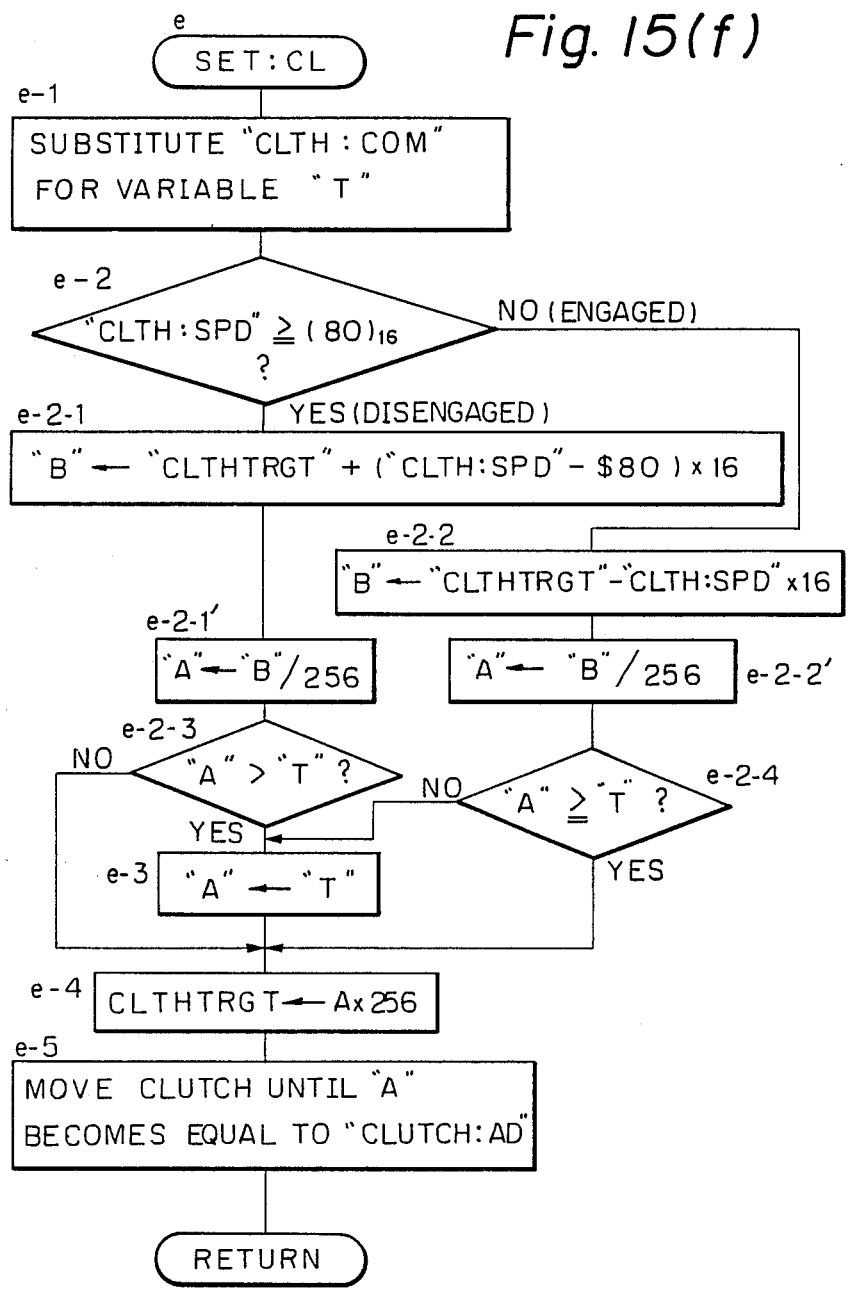

At step (e) of the flow chart of FIG. 15(f), the clutch is actually driven in accordance with CLTH:COM and CLTH:SPD.

At step (e-1), CLTH:COM (target clutch position) is substituted for a variable T.

At step (e-2), the direction of the clutch movement from the most significant bit of the CLTH:SPD is determined. If the clutch is to be shifted to the disengaged side, the process goes to step (e-2-1), and if the clutch is to be shifted to the engaged side, the process goes to step (e-2-2).

At step (e-2-1), the absolute value of CLTH:SPD multiplied by 16 is added to CLTHTRGT, and the calculated result is substituted for the value registered in the register B, which is a two byte variable.

At step (e-2-2) CLTH:SPD is multiplied by 16 and subtracted from CLTHTRGT, and the calculated result is substituted for the value registered in the register B.

At steps (e-2-1') and (e-2-2'), the upper position byte of the variable B is substituted for the variable A, which is a single byte variable. Therefore, the variable A represents a clutch position derived from CLTH:SPD (clutch speed). The clutch movement is controlled so that CLUTCH:AD approaches CLTHTRGT, which represents a clutch target absolute position.

At step (e-2-3), the absolute position T derived from the target clutch position is compared with the clutch position variable A derived from CLTH:SPD on the basis of the clutch speed. If A is larger than T, i.e., A is on the disengagement side of T, the process goes to step (e-3) wherein T is substituted for A as the target clutch position. If A is not larger than T, the process goes to step (e-4).

At step (e-2-4), a routine similar to step (e-2-3) is carried out when the clutch is to be moved to the engagement side. In this case, the larger value, i.e., the disengagement side value, is chosen as the target clutch position.

At step (e-4) the target clutch position (CLTHTRGT) is determined.

At step (e-5), the clutch valve is driven so that the variable A (upper position byte of CLTHTRGT) becomes the same as CLUTCH:AD.

At step (f) of the flow chart of FIG. 15(a), if the variable TIME is less than 32 ms, the process waits until the predetermined time of 32 ms has passed.

At step (g) of the flow chart of FIG. 15(a), the variable TIME is cleared and the process is repeated.

An actual drive pattern is described below.

When the transmission is shifted to a drive position, but the accelerator pedal is not depressed and thus the vehicle is not started, the engine is in an idle operation and, therefore, in step (b-1) of FIG. 15(b), the idle revolution speed of 440 rpm is substituted for the variable ENGINE. The variables INSHAFT and SPEED are zero and the variable ENG:INSH is 440 rpm. In step (c), the variables ACCEL and LOAD:COM are zero, since the accelerator pedal is not depressed. The variable of the clutch stroke (CLUTCH:AD) is set at $(D0)_{16}$, which is slightly on the disengaged side of the half-clutch position of $(C0)_{16}$. In step (d), LOAD:COM is zero and, therefore, the clutch engagement amount is determined only on the basis of the input shaft revolution speed in step (d-4). At this stage, the variable C is zero and, therefore, CLTH:COM is $(D0)_{16}$.

The steps from step (d-6) are used to determine CLTH:SPD. The variables A, B and C in steps (d-6), (d-7), and (d-8) are 32, 32, and 96, respectively, as read from FIGS. 17(a), 17(b), and 17(c), and therefore, CLTHTRGT is 96. However, in step (e-2-4), A is smaller than T when CLTHTRGT is $(D000)_{16}$, and therefore, CLTHTRGT is again determined to be $(D000)_{16}$, and thus the clutch remains disengaged.

Then, when the driver fully depresses the accelerator pedal in the next 32 ms, in step (b-1), ENGINE is still 440 rpm, since the engine revolution speed does not rise due to a response delay, and INSHAFT and SPEED are zero. In step (e-3), ACCEL is $(FF)_{16}$ and LOAD:COM is $(FF)_{16}$, and CLUTCH:AD is $(D0)_{16}$.

In step (d-1), LOAD:COM is $(FF)_{16}$ and, therefore, the process goes to step (d-2). In steps (d-2), (d-3), and (d-4), the variables A, B, and C are 32, 36, and 0, respectively, as read from FIGS. 16(a), 16(b), and 16(c), and CLTH:COM is $(D0)_{16} - 32 - 36 = (8C)_{16}$. In steps (d-6), (d-7), and (d-8), when the variables A, B, and C are 32, 64, and 100, respectively, CLTH:SPD is 100 and, therefore, in step (e-2-2), the variable B is $(D000)_{16} - 100 \times 16 = (C9C0)_{16}$, and thus the variable A in step (e-2-2') is $(C9)_{16}$. Therefore, since A is larger than T in step (e-2-4), CLTH:TRGT is $(C900)_{16}$ in step (e-4), and accordingly, the clutch is controlled so that CLUTCH:AD becomes $(C9)_{16}$.

After 128 ms, supposing that the engine revolution speed has risen to 880 rpm and the input shaft revolution speed is 440 rpm, the variables A, B and C are 32, 50, and 16 respectively, as read from FIGS. 16(a), 16(b), and 16(c), and therefore, CLTH:COM=$(D0)_{16} - 32 - 50 - 16 = (6E)_{16}$. On the other hand, for CLTH:SPD, the variables A, B and C are 32, 64, and 32, respectively, as read from FIGS. 17(a), 17(b) and therefore, CLTH:SPD is 64. In step (e-2-2), the variable B is $(C900)_{16} - 64 \times 16 = (C500)_{16}$ and the variable A is $(C5)_{16}$, and in step (e-2-4), CLTHTRGT is $(C500)_{16}$, since T is smaller than A.

After 256 ms, supposing that the engine revolution speed has risen to 1,000 rpm and the input shaft revolution speed is 880 rpm, the variables A, B and C are 32, 64, and 50, respectively, as read from FIGS. 16(a), 16(b) and 16(c), and therefore, the clutch target position CLTH:COM becomes $(D0)_{16} - 32 - 64 - 50 = (2A)_{16}$, which is smaller than $(60)_{16}$, and therefore, CLTH:COM is zero. For CLTH:SPD, since the variables A, B, and C are 64, 64, and 32, respectively, as read from FIGS. 17(a), 17(b), and 17(c), CLTH:SPD is 64. However, CLTH:COM is zero, and therefore, CLTH:SPD=$(7F)_{16}$ is registered. In step (e-2-2), the variable B is $(C500)_{16} - (7F)_{16} = (BD10)_{16}$ and the variable A is $(BD)_{16}$.

Figure 20:
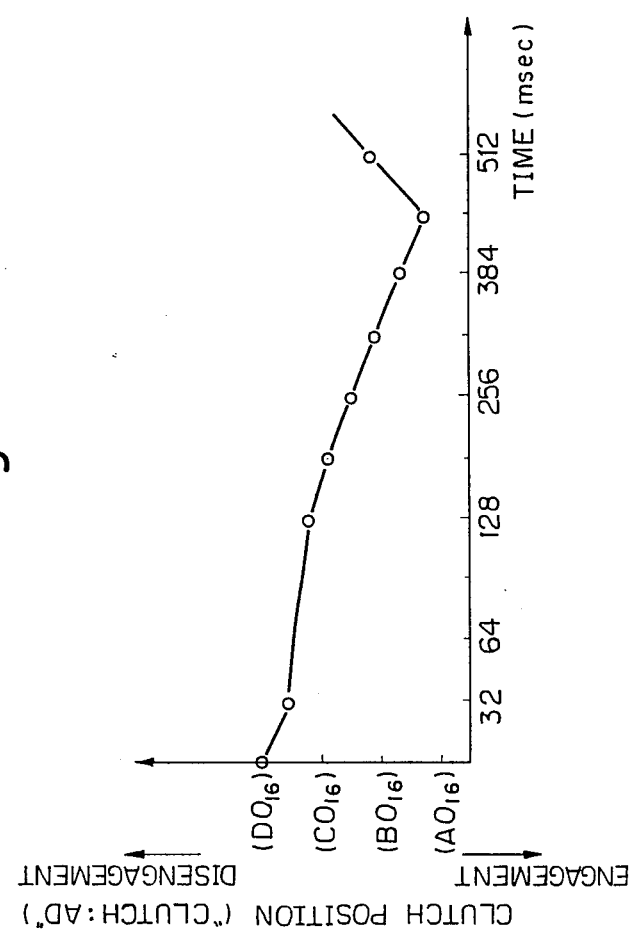
FIG. 20 is a graphical view of a clutch position in relation to time.

When a sudden load increase is applied to the engine due to, for example, a sidewalk curb, supposing that the engine revolution speed is reduced to 440 rpm and the input shaft revolution speed is reduced to 200 rpm, as for CLTH:COM, since the variables A, B, and C are 0, 32, and 0, respectively, as read from FIGS. 16(a), 16(b) and 16(c), and supposing that the accelerator pedal is not depressed, CLTH:COM is $(D0)_{16} - 32 = (B0)_{16}$. On the other hand, CLTH:SPD is 64, since the variables A, B, and C are 32, 32, and 64, respectively, as read from FIGS. 17(a), 17(b) and 17(c). If the clutch is positioned at a point where CLTHTRGT is around $(A0)_{16}$, in steps (e-2-2) and (e-2-4), the variable B is $(A000)_{16} - 64 \times 16 = (9C00)_{16}$ and the variable A is $(9C)_{16}$. Therefore, since A is smaller than T, CLTHTRGT becomes $(B0)_{16}$, so that the clutch moves to the position $(B0)_{16}$, thus protecting the engine from the overload and avoiding engine stalling. This process is represented in FIG. 20.

In the above-mentioned embodiments, when the clutch is to be engaged, in the fast start mode, the clutch position (clutch movement) is controlled on the basis of the clutch shift speed, and in the slow start mode, the clutch position is controlled on the basis of the clutch target position. Therefore, it is possible to smoothly start the vehicle with a precise response to the driver's action. When the clutch is to be disengaged, the clutch is controlled on the basis of the clutch target position, and therefore, the clutch position is precisely controlled in response to the engine revolution speed corresponding to the engine load, thus avoiding engine stalling. Also, the clutch control is processed by using a single algorithm irrespective of the clutch engagement mode, the clutch disengagement mode, and the gear shift mode, thus simplifying the control system and enabling the system to be easily and quickly turned.

In the claims:

1. A method of operating a clutch target position control system of an engine which includes a transmission with an input shaft; a clutch having a clutch actuator controlling a clutch stroke; an accelerator pedal; a sensor detecting a parameter corresponding to an accelerator pedal depression amount and providing a detection signal; an engine sensor detecting a rotational speed of the engine and providing a detection signal; an input shaft sensor detecting a rotational speed of the input shaft and providing a detection signal; and stored reference data, said method comprising the steps of:
   reading clutch engagement amounts from the stored reference data for each of the sensors, using the detection signals from each sensor as an address signal;
   calculating a total engagement amount of the read clutch engagement amounts; and
   controlling the clutch actuator and clutch stroke on the basis of the calculated total engagement amount.

2. A method of operating a clutch target position control system of an engine which includes a transmission with an input shaft; a clutch having a clutch actuator controlling a clutch stroke and having a clutch engagement side of a half clutch position; a sensor detecting a parameter corresponding to an accelerator pedal depression amount and providing a detection signal; an engine sensor detecting a rotational speed of the engine and providing a detection signal; an input shaft sensor detecting a rotational speed of the input shaft and providing a detection signal; and stored reference data, said method comprising the steps of:
   reading clutch engagement amounts from the stored reference data for each of the sensors, using the detection signals from each sensor as an address signal;
   calculating a total engagement amount of the read clutch engagement amounts and determining a clutch target position;
   calculating a speed difference between the engine rotational speed and the input shaft rotational speed;
   reading clutch speeds corresponding to the calculated speed difference, the parameter corresponding to the accelerator pedal depression amount, and the input shaft rotational speed, from the stored reference data using the detection signals from each sensor as an address signal;
   calculating a highest clutch speed of the read clutch speeds;
   reading a clutch engagement compensation coefficient from the stored reference data when a clutch position at the calculated highest clutch speed is at the clutch engagement side of the half-clutch position;
   calculating a desired clutch speed by multiplying the calculated highest clutch speed by the clutch engagement compensation coefficient; and
   controlling the clutch actuator and the clutch stroke in accordance with the calculated desired clutch speed.

3. A clutch target position control method according to claim 1 including an accelerator pedal, wherein the sensor detecting the parameter corresponding to the accelerator pedal depression amount comprises a stroke sensor attached to the accelerator pedal and said method includes detecting a stroke of the accelerator pedal using the stroke sensor.

4. A clutch target position control method according to claim 1 including a throttle, wherein the sensor detecting the parameter corresponding to the accelerator pedal depression amount comprises a load sensor connected to the throttle and said method includes detecting opening of the throttle using the load sensor.

5. A clutch target position control method according to claim 1, wherein the stored reference data includes data corresponding to gear shift positions of the transmission and said method includes reading the data in accordance with the gear shift positions.

6. A clutch target position control method according to claims 1, 2, 3, 4, or 5 including a throttle, wherein said step of reading clutch engagement amounts comprises reading the stored reference data responsive to the detection signal from the sensor detecting the parameter corresponding to the accelerator pedal depression amount, the stored reference data including clutch engagement amount data having values which increase linearly proportional to opening of the throttle.

7. A clutch target position control method according to claims 1, 2, 3, 4 or 5, wherein said step of reading clutch engagement amounts comprises reading the stored reference data responsive to the detection signal from the engine sensor, the stored reference data including clutch engagement amount data having an initial value corresponding to a first predetermined engine rotational speed, intermediate values which increase linearly proportional to the engine rotational speed and a final value corresponding to a second predetermined engine rotational speed.

8. A clutch target position control method according to claims 1, 2, 3, 4 or 5, wherein said step of reading clutch engagement amounts comprises reading the stored reference data responsive to the detection signal from the input shaft sensor, the stored reference data including clutch engagement amount data having a predetermined value corresponding to a predetermined input shaft rotational speed and maintaining the predetermined value when the input shaft exceeds the predetermined input shaft rotational speed.

9. A clutch target position control method according to claims 2, 3, 4 or 5, wherein said step of reading clutch speeds comprises reading the stored reference data responsive to the calculated speed difference between the engine rotational speed and the input shaft rotational speed, the stored reference data including clutch speed data having a peak value corresponding to the calculated speed difference being zero and reducing to a predetermined value when the calculated speed difference increases.

10. A clutch target position control method according to claims 2, 3, 4 or 5 including a throttle, wherein said step of reading clutch speeds comprises reading the stored reference data responsive to the detection signal from the sensor detecting the parameter corresponding to the accelerator pedal depression amount, the stored reference data including clutch speed data having values increasing linearly proportional to the throttle opening beyond a predetermined opening value.

11. A clutch target position control method according to claims 2, 3, 4 or 5, wherein said step of reading clutch speeds comprises reading the stored reference data responsive to the detection signal from the input shaft sensor, the stored reference data including clutch speed data having values reducing linearly to a predetermined value in response to the input shaft rotational speed increasing from zero to a predetermined input shaft rotational speed, the clutch speed data maintaining the predetermined value when the detected input shaft rotational speed increases beyond the predetermined input shaft rotational speed.

12. A method of operating a clutch target position control system of an engine having a transmission with an input shaft; a clutch having a clutch actuator controlling a clutch stroke and clutch engagement amount and providing a detection signal; an accelerator sensor detecting a parameter corresponding to an accelerator pedal depression amount and providing a detection signal; an engine sensor detecting a rotational speed of the engine and providing a detection signal; an input shaft sensor detecting a rotational speed of the input shaft and providing a detection signal; and stored reference data, said method comprising the steps of:
reading clutch engagement amounts from the stored reference data corresponding to each of the accelerator, engine and input shaft sensors, by using each of the detection signals from the accelerator sensor, engine sensor, and input shaft sensor as an address signal;
calculating a total amount of the read clutch engagement amounts; and
controlling the clutch actuator and the clutch engagement amount on the basis of the calculated total amount, wherein the stored reference data corresponding to the accelerator sensor comprises clutch engagement amount data having values increasing proportional to the parameter corresponding to the accelerator pedal depression amount, the stored reference data corresponding to the engine sensor comprises clutch engagement amount data having values being zero below a corresponding predetermined engine rotational speed, increasing to a predetermined clutch engagement amount at the predetermined engine rotational speed, and increasing proportional to the engine rotational speed beyond the predetermined engine rotational speed and the stored reference data corresponding to the input shaft sensor comprises clutch engagement amount data having values being a predetermined constant amount when the input shaft rotational speed is over a predetermined value and being zero when the input shaft rotational speed is below the predetermined value.

13. An automatic clutch control system for controlling a clutch position and a clutch speed of a clutch connected between an engine and a transmission and having a clutch actuator, the engine having a load sensor detecting a throttle opening and a speed sensor detecting the engine speed, the transmission having an input shaft and an input shaft sensor detecting the input shaft speed, said system comprising:
address converting means for converting the detected throttle opening, detected engine speed and detected input shaft speed into corresponding address signals;
data retrieval means for providing values of stored clutch target position data corresponding to each of said corresponding address signals;
calculating means for determining a clutch target position on the basis of a first difference between a constant and a sum of said values of stored clutch target position data; and
control means for controlling the clutch actuator in accordance with said determined clutch target position.

14. An automatic clutch control system according to claim 13, wherein said calculating means comprises:
means for calculating a second difference between the detected engine speed and the detected input shaft speed, clutch speeds in dependence upon the address signals and said calculated second difference, and a desired clutch speed in dependence upon a highest one of said calculated clutch speeds and a compensation coefficient.

15. An automatic clutch control system according to claim 14, further comprising:
means for controlling the clutch actuator in accordance with said calculated desired clutch speed.

* * * * *

UNITED STATES PATENT AND TRADEMARK OFFICE
CERTIFICATE OF CORRECTION

PATENT NO. : 4,858,131
DATED : August 15, 1989
INVENTOR(S) : Toshiya Sugimura et al.

It is certified that error appears in the above-identified patent and that said Letters Patent is hereby corrected as shown below: On the title page:

[73] Assignee: "Fujitsu Limited," s/b --Fujitsu Limited, Kawasaki and Isuzu Motors Limited, Tokyo, both of Japan--.

UNITED STATES PATENT AND TRADEMARK OFFICE
CERTIFICATE OF CORRECTION

PATENT NO. : 4,858,131

DATED : August 15, 1989

INVENTOR(S) : Toshiya Sugimura et al.

It is certified that error appears in the above-identified patent and that said Letters Patent is hereby corrected as shown below:

[56] References cited "4,062,624" s/b --4,620,624--.

Col. 2, line 24, after "and" insert --to--.

Col. 3, line 12, "FIG." s/b --FIGS.--, delete "is a"; line 21, "(b)" s/b --(c)--.

Col. 7, line 35, "a" s/b --$\alpha$--.

Col. 8, line 52, after "registered" insert --or stored--.

Col. 9, line 38, delete ",", after "speed" insert --and the--.

Col. 14, line 24, change "FIG." to --FIGS.--; line 38, after "stepper" insert --motor--; line 39, after "V-power" insert --source,--.

Col. 15, line 48, change "stepper" to --step--, change "step" to --stepper-- (2nd occurrence).

Col. 19, line 36, change "turned" to --operated--.

UNITED STATES PATENT AND TRADEMARK OFFICE
CERTIFICATE OF CORRECTION

PATENT NO. : 4,858,131

DATED : August 15, 1989

INVENTOR(S) : Toshiya Sugimura, et al.

It is certified that error appears in the above-identified patent and that said Letters Patent is hereby corrected as shown below:

Col. 19, line 36, change "turned" to --operated--.

Col. 8, line 51, "the" s/b --a--.

Signed and Sealed this

Twenty-third Day of April, 1991

Attest:

HARRY F. MANBECK, JR.

*Attesting Officer*

*Commissioner of Patents and Trademarks*